US012682276B2

(12) United States Patent　(10) Patent No.:　US 12,682,276 B2
Das et al.　(45) Date of Patent:　Jul. 14, 2026

(54) METHODS AND SYSTEMS FOR PROCESSING UNSTRUCTURED AND UNLABELLED DATA

(71) Applicant: MASTERCARD INTERNATIONAL INCORPORATED, Purchase, NY (US)

(72) Inventors: Debasmita Das, Kolkata (IN); Yatin Katyal, Rohtak (IN); Shashank Dubey, Jabalpur (IN); Ankur Saraswat, Gurgaon (IN); Ganesh Nagendra Prasad, West New York, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1187 days.

(21) Appl. No.: 17/496,553

(22) Filed: Oct. 7, 2021

(65) Prior Publication Data

US 2022/0114490 A1　Apr. 14, 2022

(30) Foreign Application Priority Data

Oct. 8, 2020　(IN) .............................. 202041043789

(51) Int. Cl.
　*G06N 20/00*　(2019.01)
　*G06F 16/35*　(2025.01)
(52) U.S. Cl.
　CPC ............. *G06N 20/00* (2019.01); *G06F 16/35* (2019.01)
(58) Field of Classification Search
　CPC ...... G06N 20/00; G06N 3/045; G06N 3/0464; G06N 3/08; G06N 3/09; G06N 3/044;
(Continued)

(56) References Cited

U.S. PATENT DOCUMENTS 7,792,353 B2　9/2010　Forman et al.
8,346,691 B1　1/2013　Subramanian et al.
(Continued)

OTHER PUBLICATIONS

Nikhath, et al. (2016) "Building a K-Nearest Neighbor Classifier for Text Categorization" IJCSIT, vol. 7 (Year: 2016).*

(Continued)

*Primary Examiner* — Luis A Sitiriche
(74) *Attorney, Agent, or Firm* — Jordan IP Law, LLC

(57)　ABSTRACT

Embodiments provide methods and systems for processing unstructured and unlabelled data. A method includes generating, by a processor, a structured and unlabelled training dataset from an unstructured and unlabelled dataset. The method includes categorizing the structured and unlabelled training dataset into a plurality of clusters by executing an unsupervised algorithm. Each cluster of a selected set of clusters from the plurality of clusters is labelled with an applicable label from a set of labels. The method includes executing a supervised algorithm to generate a trained supervised model using a labelled training dataset including the set of labels and an input dataset generated from plurality of datapoints present in each cluster of the selected set of clusters. The method includes generating a Labelled Data1 (LD1) by executing the trained supervised model configured to assign applicable label from the set of labels to each datapoint of the structured and unlabelled training dataset.

17 Claims, 18 Drawing Sheets

(58) Field of Classification Search
CPC ...... G06N 3/084; G06N 3/0442; G06N 3/088;
G06N 3/0475; G06N 3/0455; G06N
3/047; G06N 5/022; G06N 20/10; G06N
20/20; G06N 3/0895; G06N 5/01; G06N
3/006; G06N 3/042; G06N 3/082; G06N
3/0985; G06N 7/01; G06N 3/048; G06N
3/0499; G06N 3/094; G06N 3/096; G06N
5/047; G06N 10/20; G06N 10/40; G06N
10/60; G06N 10/70; G06N 3/063; G06N
3/091; G06N 3/092; G06N 3/098; G06N
3/123; G06N 3/126; G06N 5/027; G06N
5/04; G06N 5/043; G06N 5/045; G06N
99/00
See application file for complete search history.

(56) References Cited

U.S. PATENT DOCUMENTS

| | | | |
|---|---|---|---|
| 9,031,897 B2 | 5/2015 | Marcheret | |
| 9,646,262 B2 | 5/2017 | Phillips et al. | |
| 10,140,576 B2 | 11/2018 | Eldardiry et al. | |
| 11,374,952 B1 * | 6/2022 | Coskun ................. | G06N 3/045 |
| 2018/0101791 A1 | 4/2018 | Viswanathan | |

| | | | |
|---|---|---|---|
| 2020/0226490 A1 * | 7/2020 | Abdulaal ............... | G06N 20/00 |
| 2020/0286095 A1 * | 9/2020 | Anunciacao .......... | G06F 18/245 |
| 2021/0217529 A1 * | 7/2021 | Myers ................... | G06F 18/213 |
| 2021/0312263 A1 * | 10/2021 | Shi ......................... | G06N 3/047 |
| 2021/0365478 A1 * | 11/2021 | Mopur ............... | G06F 18/2433 |
| 2022/0012639 A1 * | 1/2022 | Ben-Itzhak ........... | G06N 20/20 |
| 2022/0084669 A1 * | 3/2022 | Van Berkel ............ | G16H 10/60 |
| 2022/0245144 A1 * | 8/2022 | Krishnamoorthy ... | G06F 16/285 |
| 2022/0300825 A1 * | 9/2022 | Echraibi ................. | G06N 7/01 |

OTHER PUBLICATIONS

Toprak, Mehmet (Sep. 18, 2020) "Semi-Supervised Learning and Look-Alike Models" Medium (Year: 2020).*
Jasneet, Sabharawl (Nov. 30, 2013) "Semi-Supervised Learning" University of British Columbia (Year: 2013).*
Jones, Tim M. (Feb. 26, 2018) "Supervised learning models" IBM Developer (Year: 2018).*
G., Yufeng (Aug. 31, 2017) "The 7 Steps of Machine Learning" Medium (Year: 2017).*
Volkmar Frinken et al., "Evaluating Retraining Rules for Semi-Supervised Learning in Neural Network Based Cursive Word Recognition", 10th International Conference on Document Analysis and Recognition, 2009, pp. 31-35.

* cited by examiner

302 — STRUCTURED AND UNLABELLED TRAINING DATASET

304 — UNSUPERVISED LEARNING ALGORITHM

306 — A PLURALITY OF CLUSTERS

310 — REJECTED SET OF CLUSTERS

308 — SELECTED SET OF CLUSTERS

312 — SET OF LABELS

300

302 — STRUCTURED AND UNLABELLED TRAINING DATASET

408 — TRAINED SUPERVISED LEARNING MODEL

502 — LABELLED DATA1 (LD1)

500

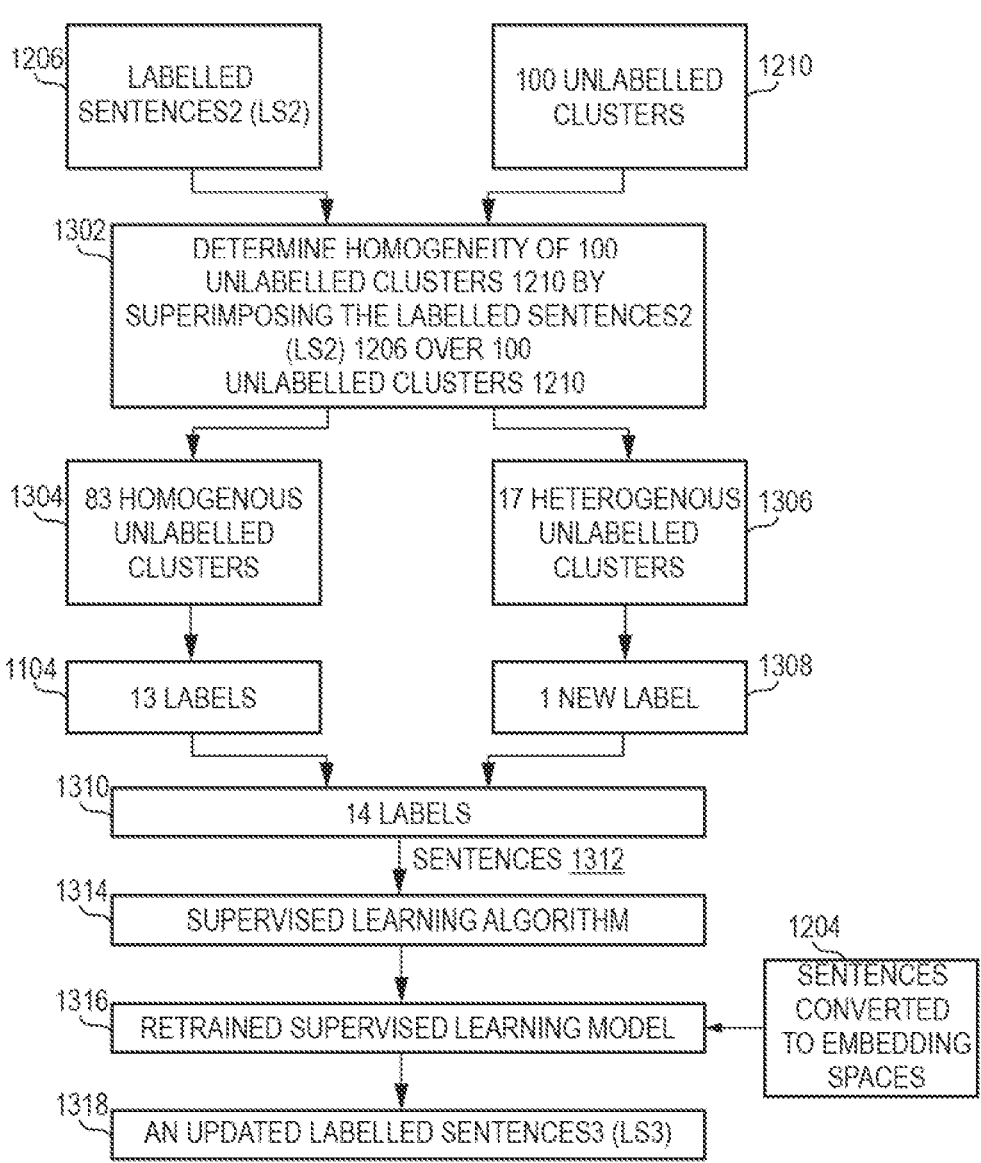
FIG. 13

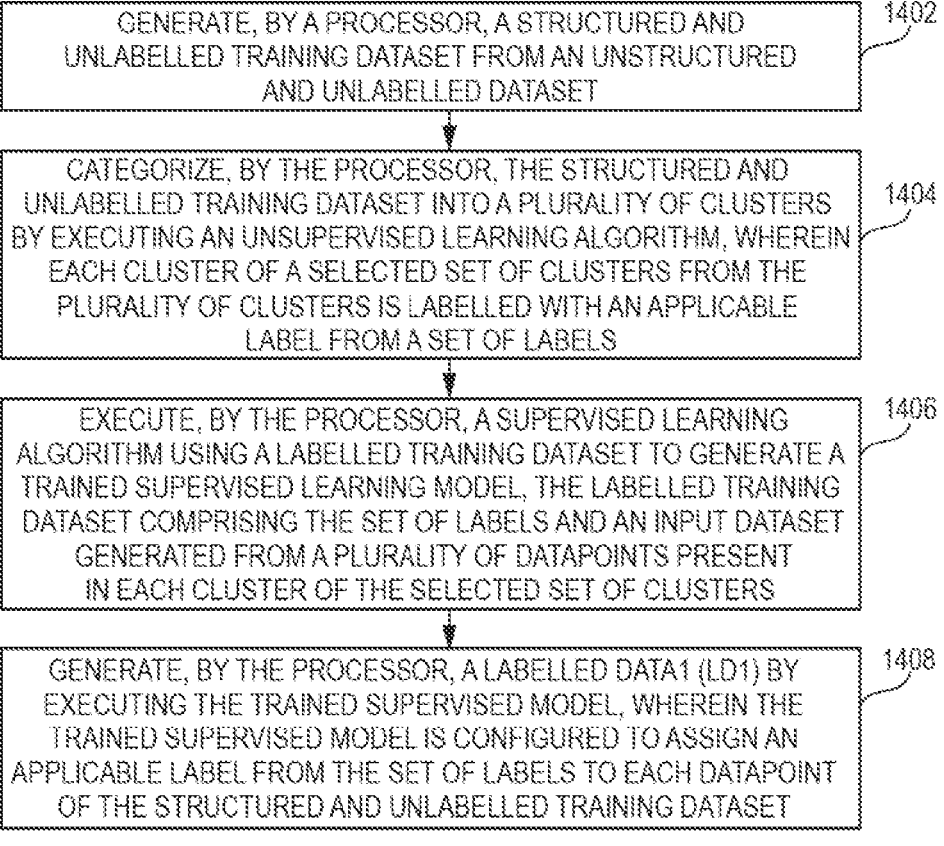

GENERATE, BY A PROCESSOR, A STRUCTURED AND UNLABELLED TRAINING DATASET FROM AN UNSTRUCTURED AND UNLABELLED DATASET — 1402

CATEGORIZE, BY THE PROCESSOR, THE STRUCTURED AND UNLABELLED TRAINING DATASET INTO A PLURALITY OF CLUSTERS BY EXECUTING AN UNSUPERVISED LEARNING ALGORITHM, WHEREIN EACH CLUSTER OF A SELECTED SET OF CLUSTERS FROM THE PLURALITY OF CLUSTERS IS LABELLED WITH AN APPLICABLE LABEL FROM A SET OF LABELS — 1404

EXECUTE, BY THE PROCESSOR, A SUPERVISED LEARNING ALGORITHM USING A LABELLED TRAINING DATASET TO GENERATE A TRAINED SUPERVISED LEARNING MODEL, THE LABELLED TRAINING DATASET COMPRISING THE SET OF LABELS AND AN INPUT DATASET GENERATED FROM A PLURALITY OF DATAPOINTS PRESENT IN EACH CLUSTER OF THE SELECTED SET OF CLUSTERS — 1406

GENERATE, BY THE PROCESSOR, A LABELLED DATA1 (LD1) BY EXECUTING THE TRAINED SUPERVISED MODEL, WHEREIN THE TRAINED SUPERVISED MODEL IS CONFIGURED TO ASSIGN AN APPLICABLE LABEL FROM THE SET OF LABELS TO EACH DATAPOINT OF THE STRUCTURED AND UNLABELLED TRAINING DATASET — 1408

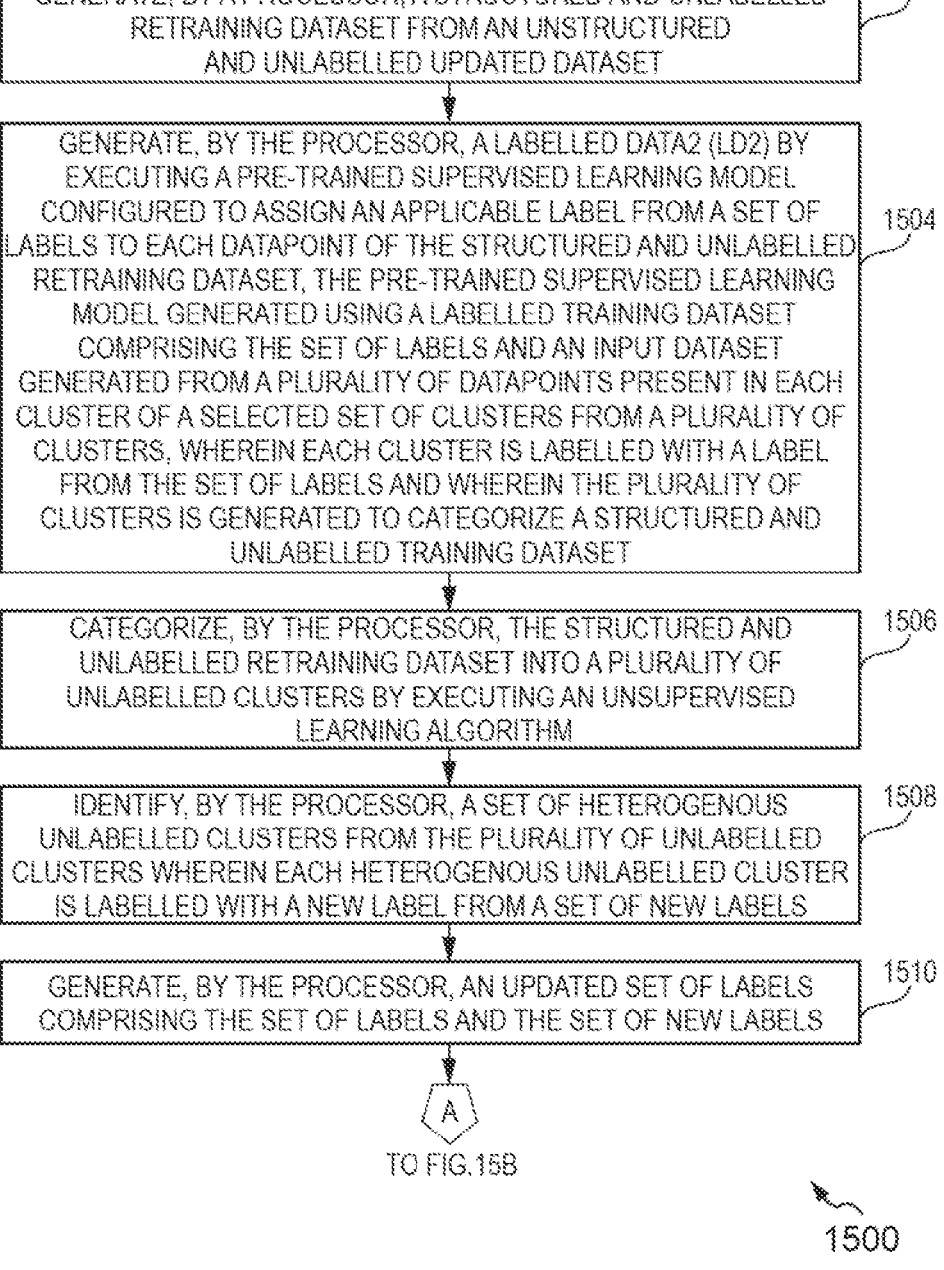

GENERATE, BY A PROCESSOR, A STRUCTURED AND UNLABELLED RETRAINING DATASET FROM AN UNSTRUCTURED AND UNLABELLED UPDATED DATASET — 1502

GENERATE, BY THE PROCESSOR, A LABELLED DATA2 (LD2) BY EXECUTING A PRE-TRAINED SUPERVISED LEARNING MODEL CONFIGURED TO ASSIGN AN APPLICABLE LABEL FROM A SET OF LABELS TO EACH DATAPOINT OF THE STRUCTURED AND UNLABELLED RETRAINING DATASET, THE PRE-TRAINED SUPERVISED LEARNING MODEL GENERATED USING A LABELLED TRAINING DATASET COMPRISING THE SET OF LABELS AND AN INPUT DATASET GENERATED FROM A PLURALITY OF DATAPOINTS PRESENT IN EACH CLUSTER OF A SELECTED SET OF CLUSTERS FROM A PLURALITY OF CLUSTERS, WHEREIN EACH CLUSTER IS LABELLED WITH A LABEL FROM THE SET OF LABELS AND WHEREIN THE PLURALITY OF CLUSTERS IS GENERATED TO CATEGORIZE A STRUCTURED AND UNLABELLED TRAINING DATASET — 1504

CATEGORIZE, BY THE PROCESSOR, THE STRUCTURED AND UNLABELLED RETRAINING DATASET INTO A PLURALITY OF UNLABELLED CLUSTERS BY EXECUTING AN UNSUPERVISED LEARNING ALGORITHM — 1506

IDENTIFY, BY THE PROCESSOR, A SET OF HETEROGENOUS UNLABELLED CLUSTERS FROM THE PLURALITY OF UNLABELLED CLUSTERS WHEREIN EACH HETEROGENOUS UNLABELLED CLUSTER IS LABELLED WITH A NEW LABEL FROM A SET OF NEW LABELS — 1508

GENERATE, BY THE PROCESSOR, AN UPDATED SET OF LABELS COMPRISING THE SET OF LABELS AND THE SET OF NEW LABELS — 1510

FROM FIG.15A

EXECUTE, BY THE PROCESSOR, A SUPERVISED LEARNING
ALGORITHM USING A LABELLED RETRAINING DATASET TO GENERATE
A RETRAINED SUPERVISED LEARNING MODEL, THE LABELLED
RETRAINING DATASET COMPRISING THE UPDATED SET OF LABELS
AND AN UPDATED INPUT DATASET GENERATED FROM A PLURALITY OF
DATAPOINTS PRESENT IN EACH UNLABELLED CLUSTER OF THE
PLURALITY OF UNLABELLED CLUSTERS                        1512

GENERATE, BY THE PROCESSOR, AN UPDATED LABELLED DATA3
(LD3) BY EXECUTING THE RETRAINED SUPERVISED MODEL, THE
RETRAINED SUPERVISED MODEL CONFIGURED TO ASSIGN AN
APPLICABLE LABEL FROM THE UPDATED SET OF LABELS TO EACH
DATAPOINT OF THE STRUCTURED AND UNLABELLED
RETRAINING DATASET                                      1514

1500

FIG. 15B

METHODS AND SYSTEMS FOR PROCESSING UNSTRUCTURED AND UNLABELLED DATA

CROSS-REFERENCE TO RELATED APPLICATIONS

The present application claims priority to Indian Patent Application No. 202041043789 (filed on Oct. 8, 2020), which is hereby incorporated by reference in its entirety.

TECHNICAL FIELD

The present disclosure relates to artificial intelligence and machine learning models and, more particularly to, methods and systems for effective categorization of unstructured and unlabelled data/dataset by developing an unsupervised model and superimposing with a supervised model.

BACKGROUND

Machine Learning (ML) is an application or a subset of Artificial Intelligence (AI) that allows machines to learn from data without being programmed explicitly. A machine learning model is the output generated when a machine learning algorithm is trained with a training dataset. Further, machine learning uses a massive amount of structured, semi-structured, and unstructured data so that a machine learning model can generate accurate results or give predictions based on that data. A data that has some semantic tags, but lacks consistency or standardization, is referred to as a semi-structured data. Structured data refers to information with a high degree of organization, while unstructured data represents the raw data as is.

Almost all information operated in day to day routine is unstructured, such as, emails, articles, or business-related data (e.g., customer interactions). Unstructured data can be extracted from a human language with Natural Language Processing (NLP), gained through various sensors, scrapped from the Internet, etc. As the majority of information one can access is unstructured, the benefits of unstructured data analysis are obvious. It can bring many useful insights and ideas on how to improve the performance of a company or a specific service. While abundant, most businesses struggle to know what to do with their unstructured data, how to make sense of the data, and how to identify actionable insights from the data.

A type of machine learning coupled with unstructured and unlabelled data is an unsupervised machine learning. The unsupervised learning algorithms learn from unlabelled and unstructured data and are more subjective in nature than the supervised learning algorithms. The unsupervised learning algorithms are unavoidable and are of growing importance in numerous fields as unlabelled and unstructured data has the potential to generate very rich insights.

Even though unsupervised learning algorithms are less complex, take place in real-time and it is often easier to get unlabelled data, there are some disadvantages. For example, it is difficult for an analyst to be very specific about the definition of all the categories generated by an unsupervised model and there may still exist some noise even in the healthy groups since the data is not known and not labelled manually in advance. When a pre-trained unsupervised learning algorithm is used to categorize a new set of data with some distinct features, there is often a chance of misclassification or non-detection of the new feature. Additionally, it is a very rigorous task to re-categorize an updated or revised dataset and often involves a huge commitment in terms of resources and time.

Accordingly, there is a need for techniques that enable effective categorization of unlabelled and unstructured data, retraining of the machine learning model less cumbersome along with easy and continuous identification of new distinct underlying patterns in the unstructured and unlabelled data.

SUMMARY

Various embodiments of the present disclosure provide systems, methods, electronic devices, and computer program products for processing unstructured and unlabelled data.

In an embodiment, a computer-implemented method is disclosed. The method includes generating, by a processor, a structured and unlabelled training dataset from an unstructured and unlabelled dataset. The method includes categorizing, by the processor, the structured and unlabelled training dataset into a plurality of clusters by executing an unsupervised learning algorithm. Each cluster of a selected set of clusters from the plurality of clusters is labelled with an applicable label from a set of labels. The method includes executing, by the processor, a supervised learning algorithm using a labelled training dataset to generate a trained a supervised learning model. The labelled training dataset includes the set of labels and an input dataset generated from a plurality of datapoints present in each cluster of the selected set of clusters. The method includes generating, by the processor, a Labelled Data1 (LD1) by executing the trained supervised model. The trained supervised model is configured to assign an applicable label from the set of labels to each datapoint of the structured and unlabelled training dataset.

In another embodiment, a computing system is provided. The computing system includes a memory including executable instructions and a processor. The processor is configured to execute the instructions to cause the computing system to at least generate a structured and unlabelled training dataset from an unstructured and unlabelled dataset. The computing system is caused to categorize the structured and unlabelled training dataset into a plurality of clusters by executing an unsupervised learning algorithm. Each cluster of a selected set of clusters from the plurality of clusters is labelled with an applicable label from a set of labels. The computing system is caused to execute a supervised learning algorithm using a labelled training dataset to generated a trained supervised learning model. The labelled training dataset includes the set of labels and an input dataset generated from a plurality of datapoints present in each cluster of the selected set of clusters. The computing system is caused to generate a Labelled Data1 (LD1) by executing the trained supervised model. The trained supervised model is configured to assign an applicable label from the set of labels to each datapoint of the structured and unlabelled training dataset.

In yet another embodiment, a computer-implemented method is disclosed. The method includes generating, by a processor, a structured and unlabelled retraining dataset from an unstructured and unlabelled updated dataset. The method includes generating, by the processor, a Labelled Data2 (LD2) by executing a pre-trained supervised model configured to assign an applicable label from a set of labels to each datapoint of the structured and unlabelled retraining dataset. The pre-trained supervised model is generated using a labelled training dataset including the set of labels and an input dataset generated from a plurality of datapoints present in each cluster of a selected set of clusters from a plurality of clusters. Each cluster is labelled with a label from the set of labels and the plurality of clusters is generated to categorize a structured and unlabelled training dataset. The method includes categorizing, by the processor, the structured and unlabelled retraining dataset into a plurality of unlabelled clusters by executing an unsupervised learning algorithm. The method includes identifying, by the processor, a set of heterogeneous unlabelled clusters from the plurality of unlabelled clusters. Each heterogeneous unlabelled cluster is labelled with a new label from a set of new labels. The method includes generating, by the processor, an updated set of labels including the set of labels and the set of new labels. The method includes executing, by the processor, a supervised learning algorithm using a labelled retraining dataset to generate a retrained supervised learning model. The labelled retraining dataset includes the updated set of labels and an updated input dataset generated from a plurality of datapoints present in each unlabelled cluster of the plurality of unlabelled clusters. The method includes generating, by the processor, an updated labelled data3 (LD3) by executing the retrained supervised model. The retrained supervised model is configured to assign an applicable label from the updated set of labels to each datapoint of the structured and unlabelled retraining dataset.

BRIEF DESCRIPTION OF THE FIGURES

For a more complete understanding of example embodiments of the present technology, reference is now made to the following descriptions taken in connection with the accompanying drawings in which:

FIG. 13 is a block diagram representation of classifying the updated career aspiration data of the plurality of employees into an updated set of labels by executing a retrained supervised model, in accordance with an example embodiment;

FIG. 14 illustrates a flow diagram of a method for processing an unstructured and unlabelled data, in accordance with an example embodiment;

FIG. 15A and FIG. 15B, collectively, illustrate a flow diagram of another method for processing an unstructured and unlabelled data, in accordance with an example embodiment.

Figure 1A:
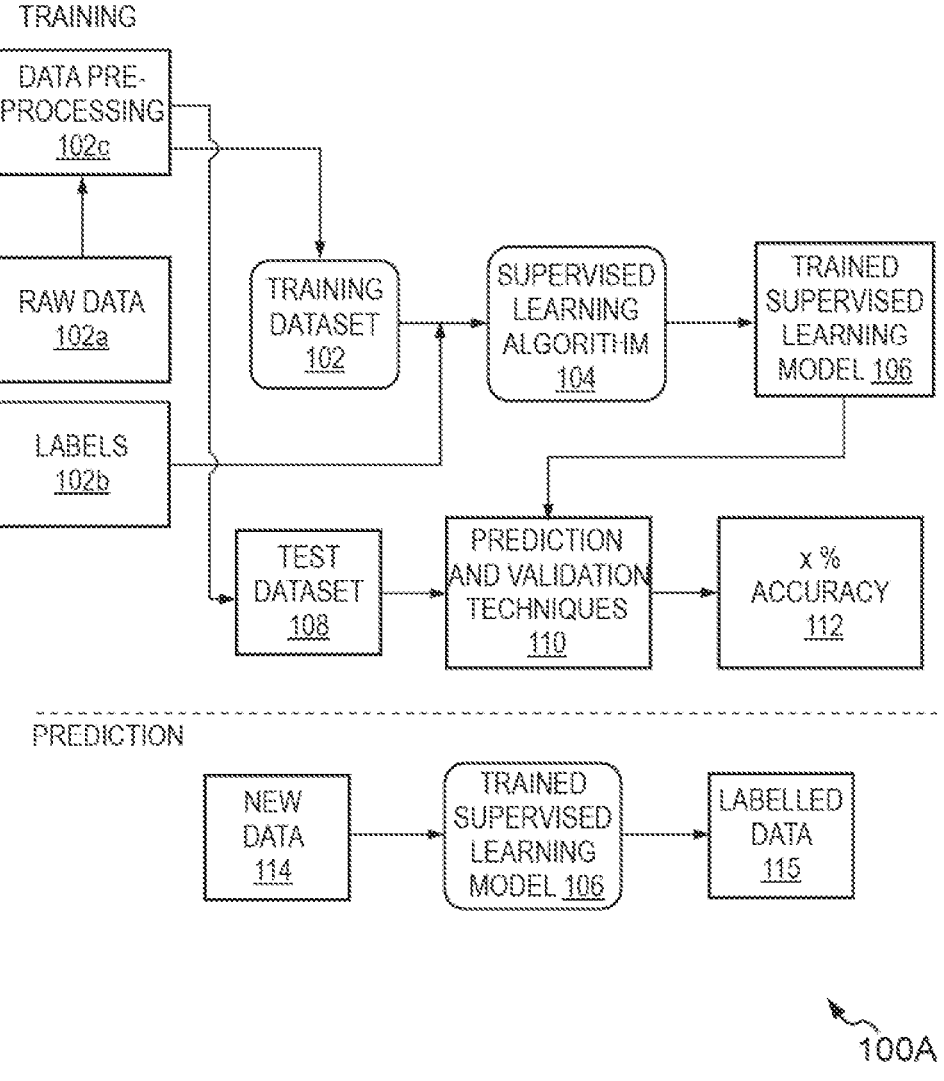
FIG. 1A illustrates a representation of an environment related to an example scenario.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" at various places in the specification is not necessarily all referring to the same embodiment, nor to separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, computing systems, electronic devices and computer program products for effective categorization of unstructured and unlabelled data using unsupervised learning and supervised learning.

In various example embodiments, the present disclosure provides a computing system that is configured to categorize/classify an unstructured and unlabelled data/dataset. A trained supervised learning model (hereinafter alternatively referred to as "supervised model") is generated and the trained supervised model is used along with an unsupervised learning algorithm to retrain the trained supervised model for an updated unstructured and unlabelled dataset. The unstructured and unlabelled dataset (i.e., raw data) is pre-processed and converted into a structured and unlabelled training dataset. Examples of the unstructured and unlabelled dataset include a textual data, an image data, a numerical data and the like. An unsupervised learning algorithm (hereinafter referred to as "unsupervised algorithm") is trained using the structured and unlabelled training dataset. Examples of the unsupervised algorithm include K-Means algorithm, mixture models, autoencoders etc. The trained unsupervised model is configured to categorize the structured and unlabelled training dataset into a plurality of clusters. Each cluster of the plurality of clusters includes a plurality of datapoints having similar patterns.

Further, a perfectly homogeneous clustering is one where each cluster has datapoints belonging to the same class label. An analyst checks the homogeneity of the plurality of clusters and provides labels to only those clusters which are devoid of noise. A cluster is considered as 'not noisy' when more than 80% of the datapoints are related to one particular topic. Based on the homogeneity, a set of clusters from the plurality of clusters is selected for labelling by the analyst and the remaining clusters being the heterogeneous clusters are kept in the rejected set of clusters. Each cluster from the selected set of clusters is labelled with an applicable label from a set of labels by the analyst. Further, it is possible that more than one cluster of the selected set of the clusters are given same label as they belong to one category only, and therefore, the number of labels does not necessarily have to be equal to the number of clusters of the selected set of clusters.

Next, a labelled training dataset is formed using the set of labels and an input dataset generated from a plurality of datapoints present in each cluster of the selected set of clusters. The labelled training dataset is used to generate a trained supervised learning model by executing a supervised learning algorithm (hereinafter referred to as "supervised algorithm"). Some non-exhaustive examples of the supervised algorithm include Long Short-Term Memory (LSTM), Support Vector Machines (SVM), linear regression, naive Bayes etc. The trained supervised model is generated to reduce the noise in the labelled clusters i.e., the selected of clusters labelled with a suitable label from the set of labels.

Finally, each datapoint of the structured and unlabelled training dataset is categorized into an applicable label from the set of labels by executing the trained supervised model to generate a Labelled Data1 (LD1). The LD1 specifically includes an applicable label from the set of labels assigned to each datapoint of a plurality of datapoints present in each cluster of the rejected set of clusters from the plurality of clusters. When the supervised model trained following the abovementioned process is launched in a real time scenario, only the unstructured and unlabelled new dataset is converted into structured and unlabelled dataset and is fed to the trained supervised model. The supervised model, as is trained to predict the labels, categorizes the new structured and unlabelled dataset into the set of labels.

Additionally, there always arises a need to retrain an existing model i.e., the pre-trained supervised model to handle new and updated dataset for categorization into correct labels. The updated dataset is in an unstructured and unlabelled format. Therefore, the updated dataset is first converted into structured and unlabelled retraining dataset. Generally, for retraining the existing model, the updated dataset needs to be fed to retrain the unsupervised model. As explained above, the unsupervised model would again create new clusters for categorizing the updated dataset. Further, it is not necessary that the datapoints which were in one cluster previously would fall in the same cluster again. The analyst has to spend extra time and efforts for deciding which clusters to label. This is not desirable.

As a solution, first, the structured and unlabelled retraining dataset is classified into the set of labels by executing the pre-trained supervised model. A corresponding Labelled Data2 (LD2) is generated by executing the trained supervised model that is configured to assign an applicable label from the set of labels to each datapoint of the structured and unlabelled retraining dataset. Next, the structured and unlabelled retraining dataset is also categorized into a plurality of unlabelled clusters by executing an unsupervised learning algorithm. Homogeneity of the plurality of unlabelled clusters is determined by superimposing the LD2 over the plurality of unlabelled clusters. A set of heterogeneous unlabelled clusters is identified from the plurality of unlabelled clusters based on determining the homogeneity. The analyst then labels each heterogeneous unlabelled cluster with a new label from a set of new labels. An updated set of labels is generated that includes the set of labels (determined during training of the supervised model) and the set of new labels (determined during retraining of the pre-trained supervised model).

Thereafter, a labelled retraining dataset is generated that includes the updated set of labels and an updated input dataset generated from a plurality of datapoints present in each unlabelled cluster of the plurality of unlabelled clusters. The labelled retraining dataset is fed to a supervised learning algorithm to retrain the pre-trained supervised learning model i.e., to generate a retrained supervised model. Finally, the structured and unlabelled retraining dataset is classified into the updated set of labels by executing the retrained supervised model. An updated labelled data3 (LD3) is generated by executing the retrained supervised model that is configured to assign an applicable label from the updated set of labels to each datapoint of the structured and unlabelled retraining dataset. When the supervised model retrained following the abovementioned steps, is launched in a real time scenario, only the unstructured and unlabelled new dataset is converted into a structured and unlabelled dataset and is fed to the retrained supervised model. The supervised model, as is retrained to predict the updated set of labels, categorizes the new structured and unlabelled dataset into the updated set of labels. Various example embodiments of present disclosure are described hereinafter with reference to FIG. 1A to FIG. 16.

FIG. 1A illustrates a representation of an environment 100A related to an example scenario. Computers can be trained to accomplish specific tasks by processing large amounts of data and recognizing patterns in the data using Artificial Intelligence (AI). A critical first step for developing a model involves gathering data from various sources such as databases, files, and external repositories. A raw data 102a to be used for developing a model is shown. The raw data 102a includes a plurality of datapoints. The raw data 102a is generally in an unstructured format and therefore is pre-processed using a data pre-processing 102c technique. The data pre-processing 102c is performed over the raw data 102a to transform the raw data 102a into a structured format suitable to develop a machine learning model as well as split the raw data 102a into a training dataset 102 and a test dataset 108. A detailed explanation of the data pre-processing 102c is explained later with reference to FIG. 2. The environment 100A also includes labels 102b for developing a supervised model. A label is provided to unlabelled data to make the unlabelled data more informative and meaningful.

A supervised learning algorithm 104 (hereinafter alternatively referred to as "supervised algorithm 104") includes a machine learning algorithm that learns on its own using the training dataset 102 and the labels 102b. More specifically, the supervised learning algorithm 104 learns from the labelled training data and helps to predict outcomes for future/unforeseen data. Trained predictions generated using the training dataset 102 are used by the supervised learning algorithm 104 to come up with a trained supervised learning model 106/computer program (hereinafter referred to as "trained model 106", or "model 106", or "supervised model 106"). For a given set of data, a supervised learning algorithm attempts to optimize a function (i.e., the model) to find the combination of feature values that result in the target output. For example, for input variables (X) and an output variable (Y), a learning algorithm is used to approximate the mapping function from the input to the output as $Y=f(X)$. The goal is to find the function 'f' so well that the output variable (Y) can be predicted when new, not training, input variables (X) are fed to the supervised model 106. The supervised algorithm 104 iteratively corrects predictions on the training dataset 102.

Whenever a model is built, the model needs to be tested and evaluated to ensure that it will not only work on the trained data, but also on an unseen data and can generate results with accuracy. If the model is not evaluated properly then the chances are that the result produced with the unseen data is not accurate. Furthermore, model evaluation helps in selection of the optimum model, which is more robust and can accurately predict responses for future subjects. There are various ways by which a model can be evaluated such as a split test, a cross-validation technique etc. The next step in the process of supervised learning includes testing the model 106 using the test dataset 108 to assess a model accuracy (x %, see, 112) via prediction and validation techniques 110. In one example embodiment, the model accuracy (x %, see, 112) is identified based on the number of correct classifications divided by a total number of test cases.

In a split test, the raw data 102a is divided into two parts, one is the training dataset 102 and the other is the test dataset 108. Once the raw data 102a is split, the supervised model 106 is trained by applying the supervised algorithm 104 over the training dataset 102. The accuracy (x %, 112) of the model 106 is tested using the test dataset 108. The ratio of dividing the raw data 102a in the training dataset 102 and the test dataset 108 may be decided on basis of the size of the raw data 102a. Different results get produced based on how the raw data 102a is divided into the training dataset 102 and the test dataset 108. If the raw data 102a is divided in 80% as a training dataset and 20% as a test dataset, or 60% as a training dataset and 40% as a test dataset, both may generate different results. Multiple split tests may also be conducted, where the raw data 102a is divided into different ratios and the result is found and compared for accuracy. Apart from the training dataset 102, and the test dataset 108, a verification dataset (not shown) also may be fed to the trained model 106. The verification dataset is used to verify the results or verify that the trained model 106 is working properly after the whole process is complete.

Once a desired accuracy is achieved, the supervised model 106 is launched in a real-time scenario such that the new unlabelled data can be presented to the model 106 and a likely label can be guessed or predicted for the unlabelled data. This is shown under a 'prediction' heading in the environment 100A. A new data 114 is fed to the trained model 106 to get the desired output in terms of a labelled data 115 i.e., each datapoint of the new data 114 is assigned an applicable label from the labels 102b by the model 106. The trained model 106 works only for specific domains such as if the trained model 106 is developed to detect images of a rose, it only gives result for rose images, but if a new data like an image of a jasmine is provided, then the trained model 106 becomes unresponsive. Furthermore, the supervised model 106 can only work for labelled training dataset. When an analyst comes across a huge amount of highly unstructured and unlabelled data, training a supervised model by forming meaningful labels for such data becomes a very tedious and time-consuming task. Successfully building, scaling, and deploying an accurate supervised machine learning model takes time and technical expertise from a team of highly skilled data scientists is required. Moreover, data scientist must rebuild models to make sure the insight given remains true until its data changes.

Figure 1B:
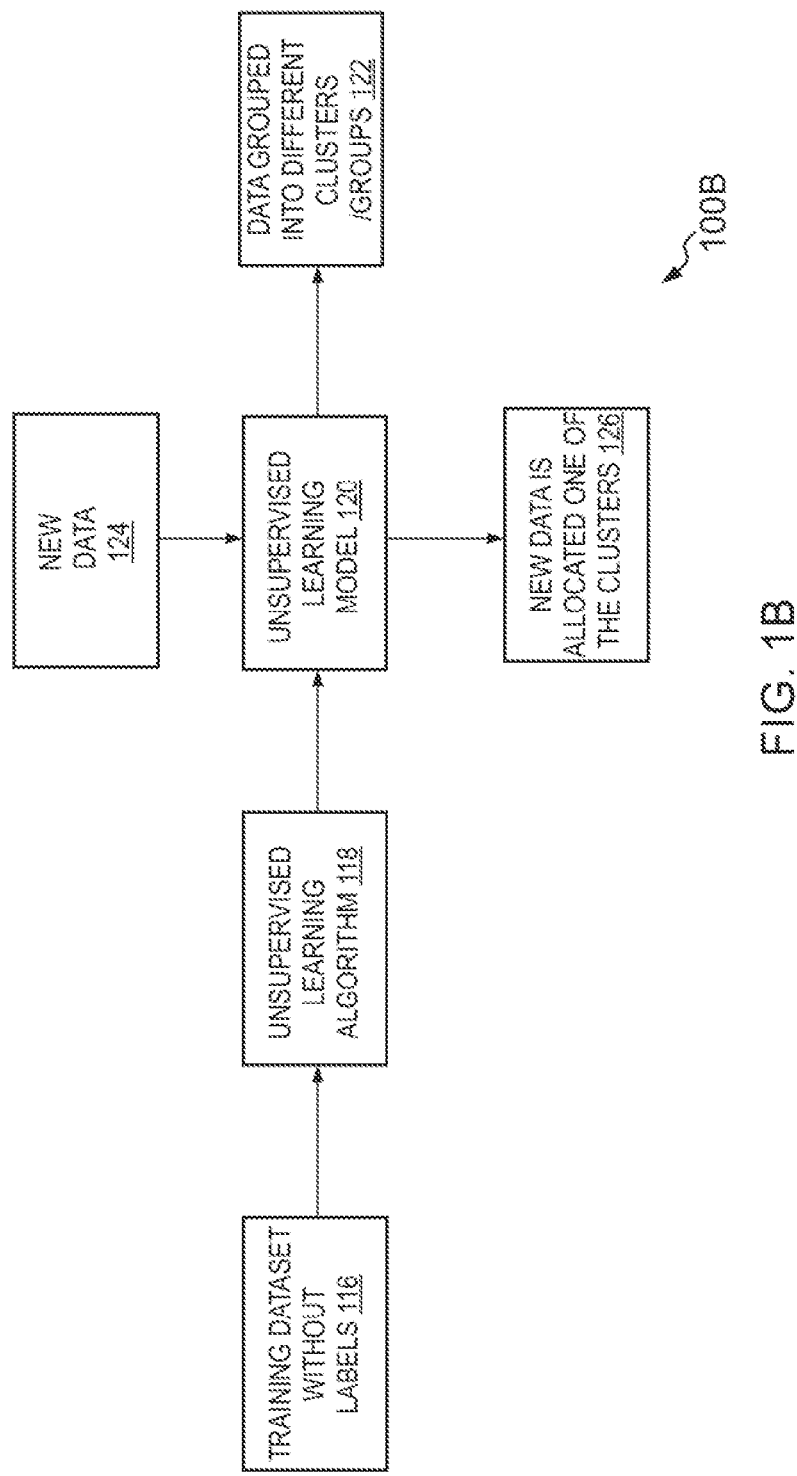
FIG. 1B illustrates a representation of an environment related to another example scenario.

FIG. 1B illustrates a representation of an environment 100B related to another example scenario. Unsupervised machine learning technique is known for processing of unlabelled and unstructured data. Unsupervised models are more subjective in nature than supervised models. However, many a times, unlabelled and unstructured data has the potential to generate very rich insights. Therefore, unsupervised models are unavoidable and are of growing importance in numerous fields. The environment 100B shows an unsupervised learning model 120 (hereinafter alternatively referred to as "unsupervised model 120", or "model 120") built by executing and training an unsupervised learning algorithm 118 (hereinafter alternatively referred to as "unsupervised algorithm 118", or "algorithm 118") by feeding a training dataset without labels 116 (hereinafter alternatively referred to as "training dataset 116"). The training dataset 116 may be the same as the training dataset 102 generated from the raw data 102a after data pre-processing 102c as explained with reference to FIG. 1A. The training dataset 116 includes unlabelled data.

The unsupervised model 120 does not generate labelled outputs as the algorithm 118 uses the training dataset 116 without any instructions on what to do with it. Absence of the corresponding output variables defines the goal in understanding the natural structure of datapoints. Unsupervised learning is modeling the distribution in the data in order to learn more about the relationship of inputs. Examples of the unsupervised algorithm 118 include hierarchical clustering, K-Means clustering, mixture models, principal component analysis, autoencoders etc. In at least one embodiment, a clustering algorithm such as a K-Means clustering algorithm is used to classify the datapoints into different clusters/groups (see, 122). The main objective of the clustering algorithm is to cluster or group input datapoints into different classes or categories using only the features derived from the input data (i.e., the training dataset 116) alone and no other external information. Unlike a classification model (e.g., the supervised model 106), the output labels are not known beforehand in clustering. The trained unsupervised model 120 is then ready to be launched in real time to accept new data 124 being allocated in one of the clusters (see, 126).

Even though unsupervised models are less complex, there are some disadvantages associated with the unsupervised models. For example, when a pre-trained unsupervised model such as the model 120 is used to categorize a new data such as the new data 124 with some distinct features, there is often a chance of misclassification or non-detection of the new feature. Since the data is not known and not labelled manually in advance, there still exists some noise even in the healthy groups and it becomes difficult to get specific definition of all the clusters generated by the unsupervised model 120. Furthermore, it is a very rigorous task to re-categorize an updated or revised dataset that often involves a big commitment in terms of resources and time.

Various embodiments of the present disclosure address the technical problems and shortcomings associated with the categorization of unstructured and unlabelled data if only the supervised model 106 as explained with reference to the example scenario (i.e., the environment 100A) of FIG. 1A is used or if only the unsupervised model 120 as explained with reference to the example scenario (i.e., the environment 100B) of FIG. 1B is used. Various embodiments of the present disclosure address these issues by developing an unsupervised model and superimposing the unsupervised model with a supervised model. Some non-exhaustive example embodiments of processing unstructured and unlabelled data are described with reference to the following description, particularly with reference to FIG. 2 to FIG. 16.

Figure 2:
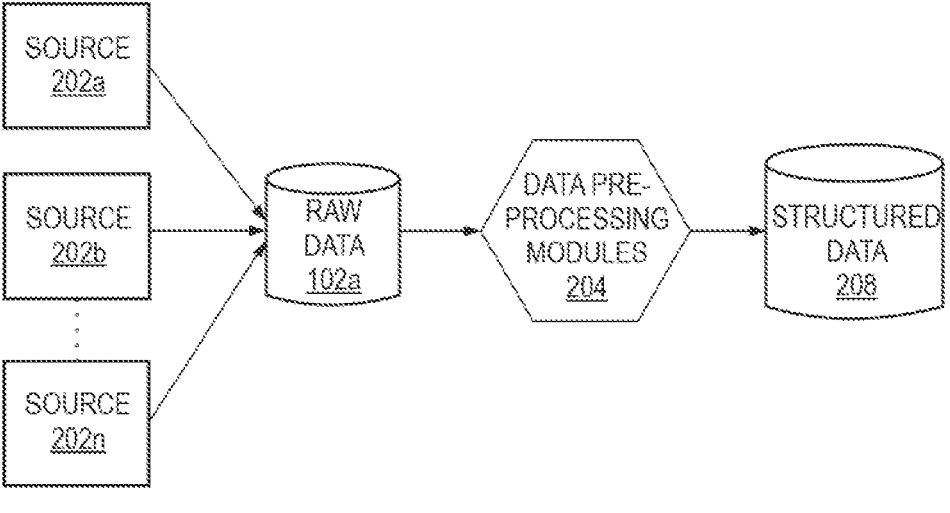
FIG. 2 is a block diagram representation of generating structured data from unstructured data, in accordance with an example embodiment.

FIG. 2 is a block diagram representation 200 of generating structured data from unstructured data, in accordance with an example embodiment of the present disclosure. Depending on the use case and the objective to be achieved using a machine learning model, a corresponding type of data is collected. The data can be collected from various sources such as databases, files, libraries, web searches, and external repositories. As shown, the raw data 102a is collected from various sources such as a source 202a, a source 202b . . . a source 202n (hereinafter alternatively referred to as "sources 202a-n"). The raw data 102a may be any data that is machine-readable or that may be converted into an embedding space. In the real world, the raw data 102a is generally incomplete i.e., lacking attribute values, lacking certain attributes of interest, or containing only aggregate data. Sometimes the raw data 102a is noisy i.e., containing errors or outliers. The raw data 102a may also be inconsistent i.e., containing discrepancies in codes or names. Since the collected raw data 102a may be in an undesired format, unorganized, or extremely large, further steps are needed to enhance its quality. Data pre-processing (e.g., the data pre-processing 102c of FIG. 1) is a data mining technique that involves transforming the raw data 102a into an understandable format.

The raw data 102a (i.e., the unstructured and unlabelled data) is fed to one or more corresponding data pre-processing modules 204 for being converted to a suitable form (i.e., structured data 208) for a specific machine learning algorithm. The data pre-processing modules 204 are configured to perform various operations on the raw data 102a such as importing applicable libraries, checking out any missing values, checking categorical values, splitting the raw data 102a into the training dataset 102 and the test dataset 108, performing feature scaling, removing duplicates, correcting errors, normalization, data type conversions, visualizing data to help detect relevant relationships between variables or class imbalances and the like. Some non-exhaustive examples of the data pre-processing algorithms include missing values imputation, noise filtering, dimensionality reduction (including feature selection and space transformations), instance reduction (including selection and generation), discretization and treatment of data for imbalanced pre-processing and the like.

The three common steps for pre-processing the raw data 102a are formatting, cleaning, and sampling. Formatting is required to ensure that all variables within the same attribute are consistently written. For example, all phone numbers, addresses, or sums of money should be written in the same format. Data cleaning is applied to remove messy data and manage missing values. Data cleaning also includes filling in the missing values with mean values or the most frequent items or just dummy values (e.g. 0). Sampling might be required if there is a huge amount of raw data 102a. During exploring and prototyping, a smaller representative sample can be fed into a model to save time and costs. Thereafter, the structured data 208 is generated by transforming the cleaned and formatted data (not shown) into a form that is appropriate for feeding into a model. The structured data 208 may be generated through scaling, decomposition, or aggregation. For example, if a date has a day component and a time component, and only the time part is relevant to the problem being addressed, splitting it can capture more specific data. In some cases, combining multiple features into a single feature by feature aggregation is more useful for an algorithm. In at least one embodiment, the structured data 208 is also unlabelled data.

Figure 3:
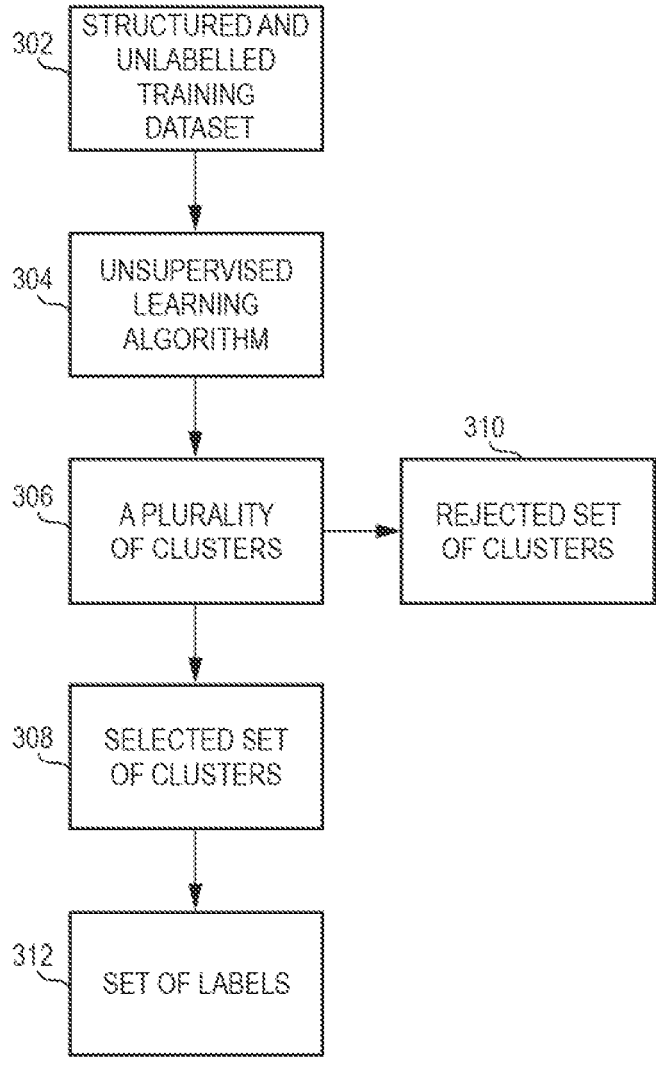
FIG. 3 is a block diagram representation of labelling only a selected set of clusters from a plurality of clusters, in accordance with an example embodiment.

FIG. 3 is a block diagram representation 300 of labelling only a selected set of clusters from a plurality of clusters, in accordance with an example embodiment. More specifically, FIG. 3 explains creation of a set of labels for training a supervised model for classifying a structured and unlabelled training dataset 302. As explained with reference to FIG. 2, a raw data such as the raw data 102a being an unstructured and unlabelled dataset is pre-processed and transformed into the structured data 208. Similarly, a structured and unlabelled training dataset 302 is transformed from an unstructured and unlabelled dataset using the data pre-processing modules 204. For example, if the unstructured and unlabelled dataset is in a text format, it is pre-processed using Regular Expressions (Regex) to remove spaces, symbols etc. A word2vec algorithm is trained to convert the text into an embedding space/structured format. The word2vec algorithm takes a large corpus of text as its input and produces a vector space, typically of several hundred dimensions, with each unique word in the corpus being assigned a corresponding vector in the space. Word vectors are positioned in the vector space such that words that share common contexts in the corpus are located close to one another in the space.

The structured and unlabelled training dataset 302 (hereinafter alternatively referred to as "training dataset 302") is used to train an unsupervised learning algorithm 304 (e.g., a clustering algorithm) that categorizes the training dataset 302 into a plurality of clusters 306/homogeneous groups as explained earlier with reference to FIG. 1B. In one embodiment, an ensemble of three K-Means clustering algorithm is used to generate the plurality of clusters 306. When K-Means algorithm is used for the first time, the clusters that the algorithm produces may get generated very close together but may actually be different. This results in difficulty to find a homogeneous cluster of interest. To overcome this problem, all the smaller clusters may be removed to come up with a mid-level cluster which may be an amalgamation of a lot many new patterns still left. The datapoints belonging to that mid-level cluster may be used to train the K-Means algorithm second time and similarly the third time to get a very good set of homogeneous clusters. In one example embodiment, a threshold for determining a homogeneous group is predetermined as greater or equal to 80%.

After running an ensemble of three K-Means clustering algorithm, the plurality of clusters 306 is distinctively divided into a set of homogeneous clusters and a set of heterogeneous clusters. The set of homogeneous clusters is selected for labelling by an analyst, t. This is represented as a selected set of clusters 308. For example, if there are a hundred clusters generated at the end of the ensemble of three K-Means clustering algorithm, not all hundred clusters are sent to the analyst for labelling. Labels are given to only those clusters for which a cluster is at least homogeneous for more than 85% (an example of a predetermined threshold) of the population. It means that a cluster is a homogeneous cluster if more than 85% of the datapoints in that cluster are related to one topic/pattern.

The set of heterogeneous clusters is rejected for any further processing. This is represented as a rejected set of clusters 310. Each cluster from the selected set of clusters 308 is labelled with a label from a set of labels 312 by an analyst. The set of labels 312 is unique labels as confirmed by business experts. Further, the set of labels 312 may not be equal to the selected set of clusters 308 because one or more clusters from the selected set of clusters 308 may fall under the same category as examined by the analyst and therefore be given the same one label. The set of labels 312 is used to generate a labelled training dataset as explained hereinafter with reference to FIG. 4.

Figure 4:
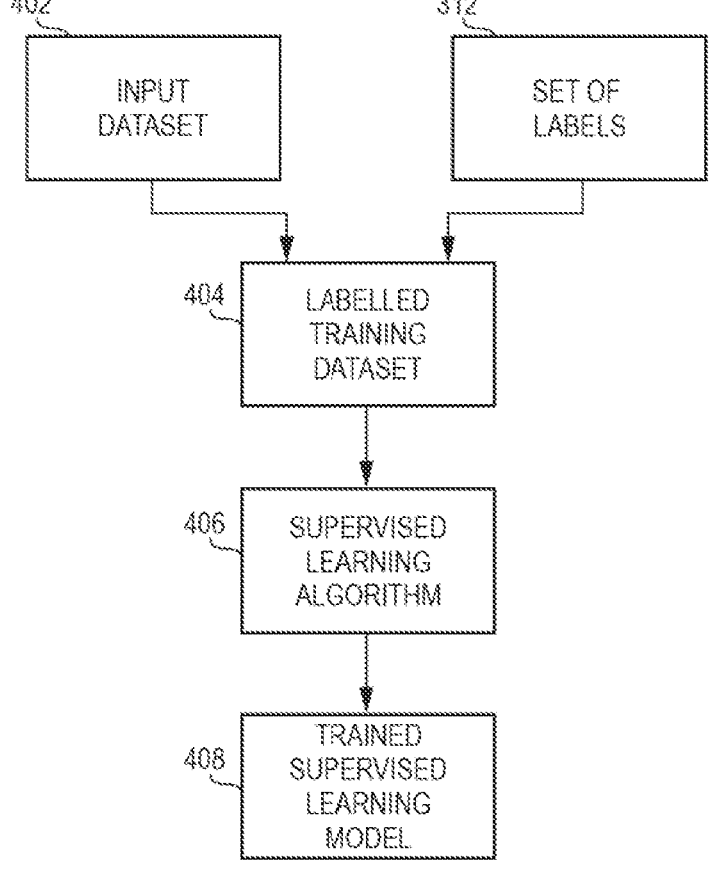
FIG. 4 is a block diagram representation of generating a trained supervised model, in accordance with an example embodiment.

FIG. 4 is a block diagram representation 400 of generating a trained supervised model, in accordance with an example embodiment. As explained with reference to FIG. 1A earlier, the training dataset 102 and the labels 102b are fed to train the supervised algorithm 104 in order to come up with the trained supervised model 106. A supervised algorithm based on the datapoints against the labelled clusters i.e., each cluster from the selected set of clusters 308, is trained. For an independent variable (X) being a subset (i.e., a plurality of datapoints present in each cluster of the selected set of clusters 308) of the training dataset 302, dependent variable (Y) consists of the set of labels 312 assigned by the analyst. When the set of labels 312 includes a plurality of labels, the independent variable (X) is divided into multi-class classification.

Accordingly, an input dataset 402 is generated from a plurality of datapoints present in each cluster of the selected set of clusters 308. The input dataset 402 and the set of labels 312 together form a labelled training dataset 404. The labelled training dataset 404 is fed to a supervised learning algorithm 406. Trained predictions generated using the labelled training dataset 404 are used by the supervised learning algorithm 406 to come up with a trained supervised learning model 408 (hereinafter alternatively referred to as "supervised model 408" or "model 408"). The supervised model 408 extensively uses dropouts so as not to overfit on the labelled training dataset 404. Further, the supervised model 408 helps in reducing noise in the labelled clusters. In an example embodiment, a bi-directional Long Short-Term Memory (LSTM) concatenated with a max-pool layer is used as the supervised learning algorithm 406 for training the supervised model 408.

Further, the input dataset 402 may be divided into a training dataset and a test dataset (not shown). For example, 80% of the datapoints used to generate the input dataset 402 may be used for the labelled training dataset 404 and 20% of the remaining dataset may be used for the test dataset. Once trained, the supervised model 408 is tested using the test dataset to determine the accuracy level as explained with reference to FIG. 1A. When the desired accuracy is achieved, the model 408 is saved and considered ready for launching in a real-time use case.

Figure 5:
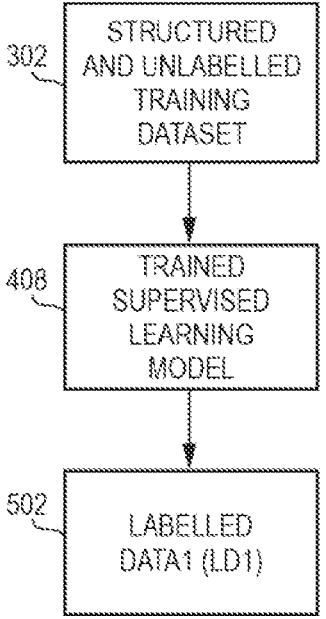
FIG. 5 is a block diagram representation of classifying a structured and unlabelled training dataset into a set of labels by executing a trained supervised model, in accordance with an example embodiment.

FIG. 5 is a block diagram representation 500 of classifying a structured and unlabelled training dataset into a set of labels by executing a trained supervised model, in accordance with an example embodiment. Scoring is the process of generating values based on a trained machine learning model, given some new input data and is also called prediction. The values or scores that are created can represent predictions of future values, but they might also represent a likely category or outcome. The meaning of the score depends on the type of input data, and the type of model created, for example, a predicted class or outcome is for classification models. The new data that is provided as input generally needs to have the same patterns that were used to generate the trained model, minus the label, or outcome.

As shown, the supervised model 408 is fed with the structured and unlabelled training dataset 302 that specifically includes a plurality of datapoints present in each cluster of the rejected set of clusters 310 forming new data and a plurality of datapoints present in each cluster of the selected set of clusters 308 of FIG. 3. The trained supervised learning model 408 scores the structured and unlabelled training dataset 302 by assigning an applicable label from the set of labels 312 to each datapoint of the structured and unlabelled training dataset 302 to generate a Labelled Data1 (LD1) 502. Thus, the supervised model 408 provides a legitimate assignment of category for the unlabelled data i.e., the rejected set of clusters 310. When the model 408 is used in real-time use case, apart from the structured and unlabelled training dataset 302, any relevant new raw data is collected based on the use case and is converted into the structured data 208 as explained with reference to FIG. 2. The structured data 208 is fed to the supervised model 408 and is classified into the set of labels 312 as explained hereinabove.

Furthermore, when the data gets revised or updated (e.g., the volume and frequency of new data is high) related to the same objective for which the model 408 is developed, there may arise a need to retrain the model 408 periodically (e.g., monthly, quarterly or yearly). The model 408 may also be retrained in order to find a new pattern/new trend from the updated data. In one embodiment, the trained supervised learning model 408 may also need to be retained based on the identification of lack of accuracy (e.g., when the clusters are not giving homogeneous results) as the data gets updated continuously. In an example embodiment, the updated data may not be entirely new data. Retraining a model refers to re-running the process that generated the previously developed model on a new training set of data. The features, model algorithm, and hyperparameter search space may remain the same during retraining. Further, retraining may not involve any code changes.

As explained with reference to foregoing figures, in order to generate a retrained model (i.e., the model 408), the updated data after being transformed into a structured format needs to be fed for retraining an unsupervised algorithm to generate a plurality of clusters (as specifically explained with reference to FIG. 3). The unsupervised algorithm 304 generates new clusters based on the structured updated data and the process of selecting the homogeneous clusters needs to be repeated. Further, it is possible that the datapoints which were present in one cluster earlier may fall in different cluster during retraining. This is a time-consuming process for an analyst to find the homogeneous clusters for the updated data and then label each of them. An effective and simple method of retraining the model 408 for the updated data/dataset is explained hereinafter with reference to FIG. 6 to FIG. 9.

Figure 6:
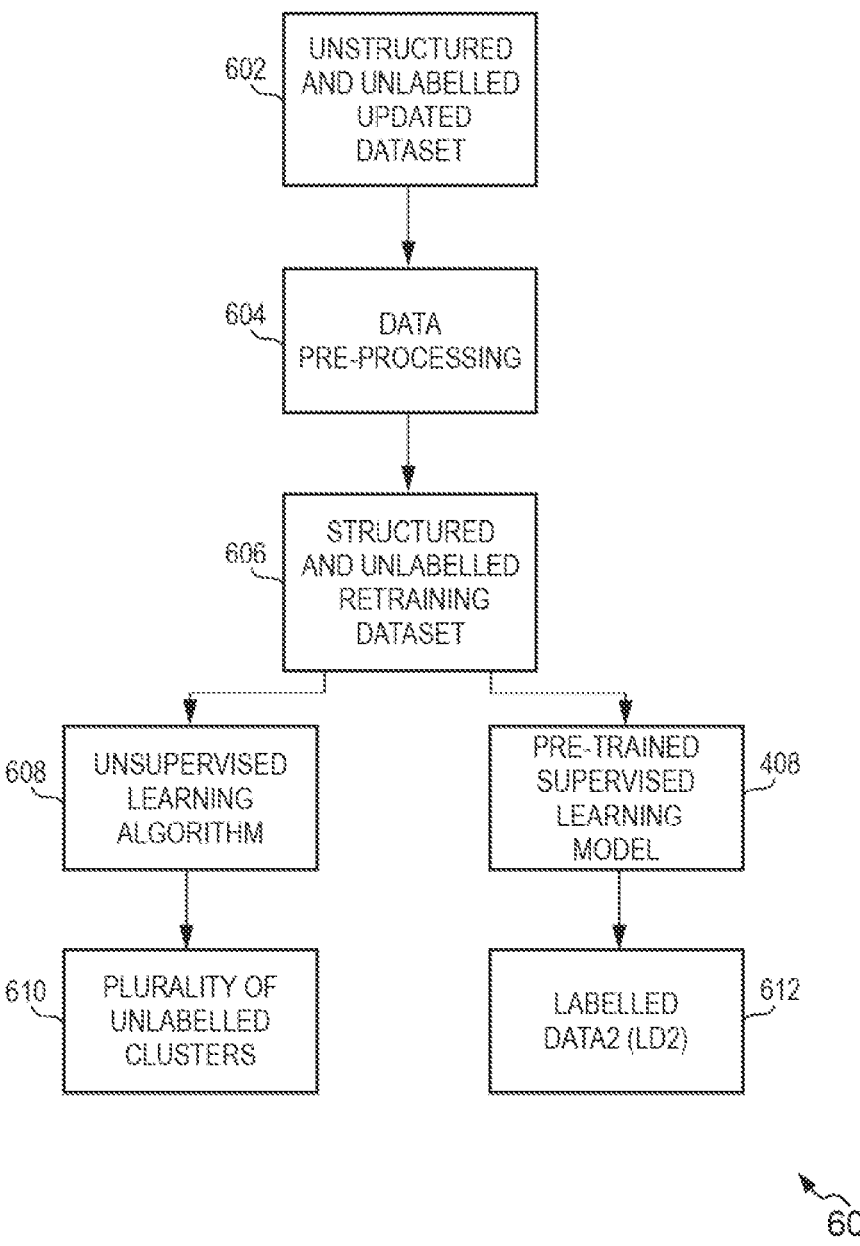
FIG. 6 is a block diagram representation of processing an unstructured and unlabelled updated dataset, in accordance with an example embodiment.

FIG. 6 is a block diagram representation 600 of processing an unstructured and unlabelled updated dataset, in accordance with an example embodiment. An unstructured and unlabelled updated dataset 602 (hereinafter alternatively referred to as "updated dataset 602") is shown and is raw in nature. In an example embodiment, the updated dataset 602 may be entirely new data. In another example embodiment, the updated dataset 602 may be a combination of new data and old data (e.g., the structured data 208). A data pre-processing 604 technique is performed over the updated dataset 602 as explained earlier with reference to FIG. 2 to convert/transform the updated dataset 602 into an embedding space/structured and unlabelled retraining dataset 606 (hereinafter alternatively referred to as "retraining dataset 606"). The retraining dataset 606 is used to retrain an unsupervised learning algorithm 608 (e.g., a K-means clustering algorithm) to be categorized into a plurality of unlabelled clusters 610. The plurality of unlabelled clusters 610 is not sent for labelling to an analyst yet as it is a time-consuming and inaccurate process.

The retraining dataset 606 is also fed to the supervised model 408 trained previously (hereinafter alternatively referred to as "pre-trained supervised model 408" or "pre-trained model 408") to be classified into a Labelled Data2 (LD2) 612. The pre-trained model 408 is already trained to classify the structured and unlabelled training dataset 302 into the set of labels 312 and therefore, the model 408 is configured to assign a label from the set of labels 312 to each datapoints of the retraining dataset 606. Since the supervised model 408 is trained to process only the set of labels 312, the retraining dataset 606 is classified only into the set of labels 312. However, there may be some new trends/patterns present in the updated dataset i.e., the retraining dataset 606. Labelling the datapoints representing a new pattern with any label from the set of labels 312 results in incorrect labelling as the datapoints ideally belong to a whole new different category. The model 408 ends up giving a label to each datapoint of the retraining dataset 606. As explained, it is possible that the label is wrong and a particular datapoint/a set of datapoints belongs to a different category. Thus, labelling only based on the trained supervised model 408 results in inaccurate predictions. In order to identify whether any new patterns are present in the retrained dataset 606, the unsupervised algorithm 608 is run in advance that generates some clusters or patterns which were not visible earlier as part of the plurality of unlabelled clusters 610.

Figure 7:
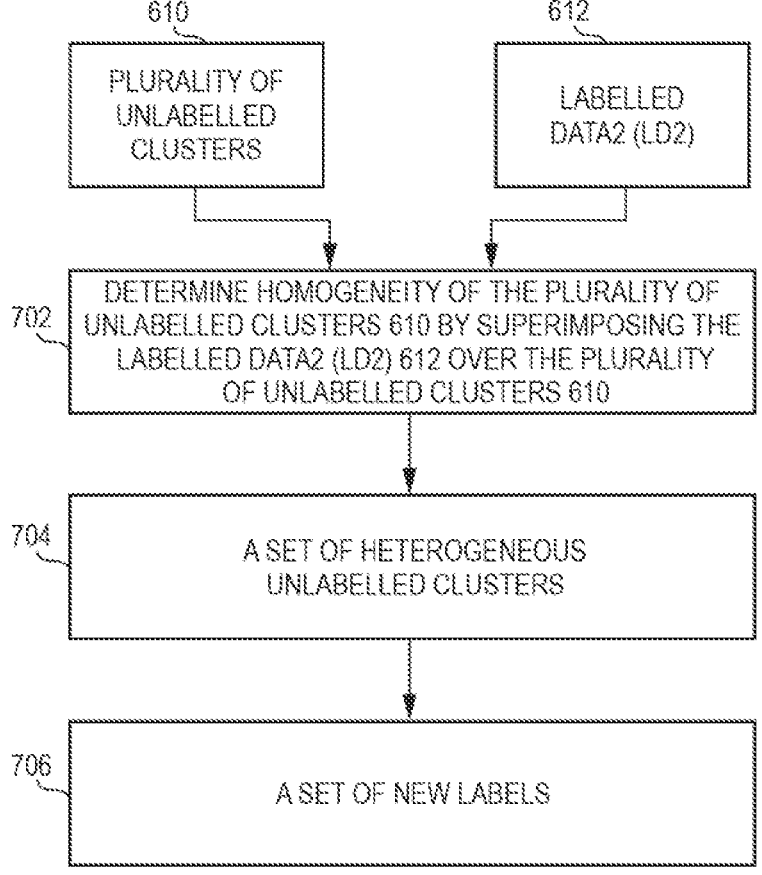
FIG. 7 is a block diagram representation of labelling a set of heterogeneous unlabelled clusters, in accordance with an example embodiment.

FIG. 7 is a block diagram representation 700 of labelling a set of heterogeneous unlabelled clusters, in accordance with an example embodiment. The LD2 612 labelled using the set of labels 312 and the plurality of unlabelled clusters 610 is processed to determine homogeneity of the plurality of unlabelled clusters 610 by superimposing the LD2 612 over the plurality of unlabelled clusters 610 (see, 702). Superimposing results in having a set of homogeneous unlabelled clusters and the remaining heterogeneous unlabelled clusters are tagged as 'can't classify' category because the level of noise in those clusters is higher than a predetermined threshold value. For example, 90% similarity with the LD2 612 is not achieved by a set of heterogeneous unlabelled clusters 704. It also means that the datapoints present in each heterogeneous unlabelled cluster are given a wrong label by the model 408 while generating the LD2 612. That is how the set of heterogeneous unlabelled clusters 704 is identified. Only the set of heterogeneous unlabelled clusters 704 is sent to an analyst. The analyst then labels each heterogeneous unlabelled cluster using a new label from a set of new labels 706. Therefore, instead of labelling each unlabelled cluster from the plurality of unlabelled clusters 610, which is a tedious job, the analyst only needs to label the set of heterogeneous unlabelled clusters 704 which is quite less in number compared to the plurality of unlabelled clusters 610.

For example, the unsupervised algorithm 608 generates seventy-five unlabelled clusters. When overlapped with the LD2 612 generated by the model 408, concentration of the same labels in the plurality of datapoints of each unlabelled cluster of the plurality of unlabelled clusters 610 is determined and the set of very heterogeneous unlabelled clusters is identified. Only 90% of datapoints may be labelled based on homogeneity and 10% of the datapoints which belong to one or two heterogeneous unlabelled clusters are not labelled or wrongly labelled because the values of the labels in those clusters are very scattered. For example, if there are five or six kinds of labels in one particular cluster, then it is very much possible that it is a heterogeneous unlabelled cluster. Therefore, instead of seventy-five unlabelled clusters, the analyst only needs to label one or two heterogeneous unlabelled clusters. Alternatively, if all the seventy-five unlabelled clusters, when superimposed with the LD2 612, receive a correct label, it means that there is no update i.e., a new trend/new pattern is present in the retraining dataset 606.

Figure 8:
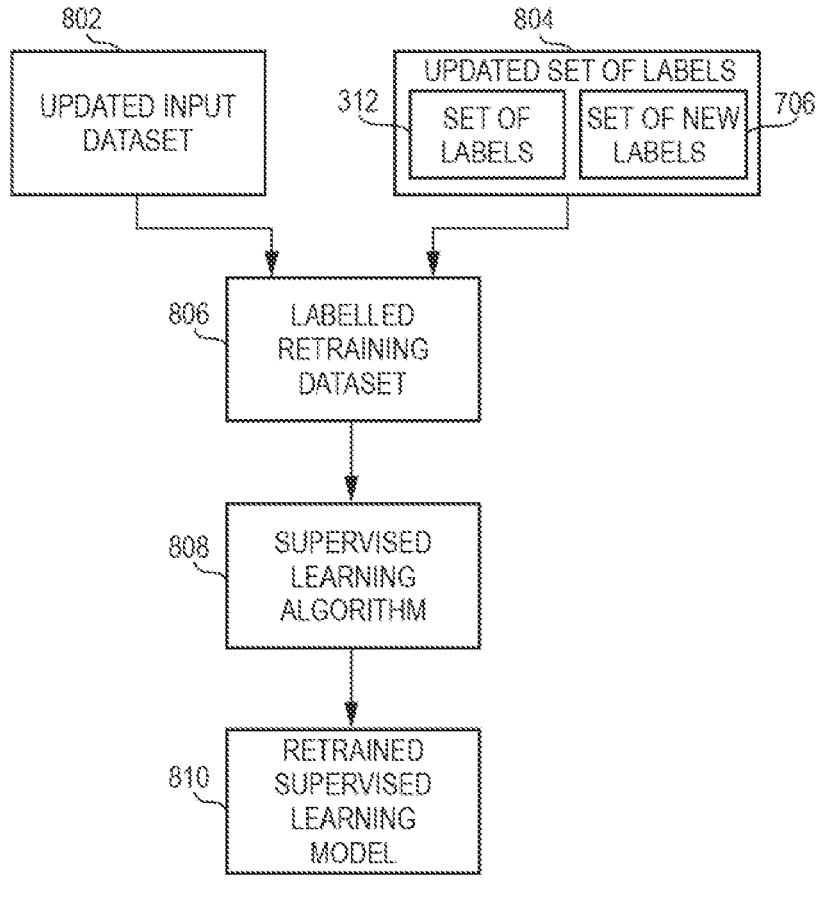
FIG. 8 is a block diagram representation of generating a retrained supervised model, in accordance with an example embodiment.

FIG. 8 is a block diagram representation 800 of generating a retrained supervised model, in accordance with an example embodiment of the present disclosure. An updated set of labels 804 is generated by adding the set of new labels 706 to the set of labels 312. As the set of new labels 706 is given to the set of heterogeneous unlabelled clusters 704 and the set of labels 312 is given to the remaining set of homogeneous unlabelled clusters, each datapoint present in the plurality of unlabelled clusters 610 is given an applicable label from the updated set of labels 804. As explained with reference to FIG. 4 earlier, a supervised algorithm is trained based on the datapoints against the labelled clusters i.e., each cluster from the plurality of unlabelled clusters 610. For an independent variable (X) being a subset of the retraining dataset 606, a dependent variable (Y) consists of the updated set of labels 804.

Accordingly, an updated input dataset 802 is generated from a plurality of datapoints present in each cluster of the plurality of unlabelled clusters 610. The updated input dataset 802 and the updated set of labels 804 together form a labelled retraining dataset 806. The labelled retraining dataset 806 is fed to a supervised learning algorithm 808 (hereinafter alternatively referred to as "supervised algorithm 808"). Trained predictions generated using the labelled retraining dataset 806 are used by the supervised algorithm 808 to come up with a retrained supervised learning model 810 (hereinafter alternatively referred to as "supervised model 810" or "model 810"). The supervised model 810 helps in reducing noise in the labelled clusters. The process of retraining the model 810 keeps running till the new data keeps updated, and accordingly, the new data is categorized into the clusters to check if any of those clusters have any additional information. If yes, such clusters with additional information are presented to an analyst for manual labelling that gives a meaningful business reason. The loop keeps running in a way that the model 810 never ends up having fewer labels than the updated dataset.

Further, the updated input dataset 802 may be divided into a training dataset and a test dataset (not shown). For example, 70% of the datapoints used to generate the updated input dataset 802 may be used for labelled retraining dataset 806 and 30% of the remaining dataset may be used for the test dataset. Once retrained, the supervised model 810 is tested using the test dataset to determine the accuracy level as explained with reference to FIG. 1A. When the desired accuracy is achieved, the model 810 is saved and considered ready for launching in a real-time use case.

Figure 9:
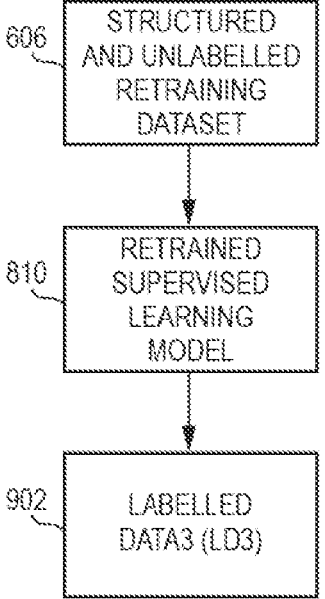
FIG. 9 is a block diagram representation of classifying a structured and unlabelled retraining dataset into an updated set of labels by executing a retrained supervised model, in accordance with an example embodiment.

FIG. 9 is a block diagram representation 900 of classifying a structured and unlabelled retraining dataset into an updated set of labels by executing a retrained supervised model, in accordance with an example embodiment. As shown, the retrained supervised learning model 810 is fed the structured and unlabelled retraining dataset 606 that specifically includes a plurality of datapoints present in each cluster of the plurality of unlabelled clusters 610 of FIG. 6. The supervised model 810 scores the structured and unlabelled retraining dataset 606 by assigning an applicable label from the updated set of labels 804 to each datapoint of the structured and unlabelled retraining dataset 606 to generate an updated Labelled Data3 (LD3) 902. Thus, when the model 810 is used in a real time use case, apart from the structured and unlabelled retraining dataset 606, any relevant new raw data is collected based on the use case and is converted into a structured dataset that can be fed to the retrained supervised learning model 810 and is classified into the updated set of labels 804.

Human resources analytics is gaining popularity lately and there are many sources of unlabelled data available, which if analysed and mined, can generate very useful insights for Human Resources (HR) department of an enterprise. Specifically, helping the enterprise achieve better employee engagement and satisfaction may be made possible if the unlabelled data is processed carefully. However, because the data is very unstructured and not labelled, processing such data is extremely difficult. FIG. 10 to FIG. 13 hereinafter explain training of a supervised model for classifying an unstructured and unlabelled dataset with respect to a use case of categorizing a career aspiration data of a plurality of employees of an enterprise. FIG. 10 to FIG. 13 also explain retraining of the pre-trained supervised model with respect to the same use case for determining a new trend in an updated career aspiration data of the plurality of employees (hereinafter alternatively referred to as "employees") of the enterprise.

For instance, a supervised model as explained with reference to FIG. 4 and FIG. 5, is configured to categorize a career aspiration data of the employees into four categories (i.e., labels), namely, 'Expanded Opportunities', 'Enhance Skills and Scope in Current Role', 'Senior Level Promotion', and 'Relocation'. When the career aspiration data gets updated with a new set of employees or the existing employees change the career aspirations in the coming days, identifying new categories in a very time-effective way is a challenge that is overcome by the embodiments of the present disclosure as explained with reference to FIG. 7 to FIG. 9. For example, a new category, namely, 'Taking More Responsibilities' on an updated career aspiration document may be found while retraining the pre-trained supervised model where many employees are found asking for more responsibilities to advance in their careers. 'Taking More Responsibilities' is a very distinct trend/pattern from the four categories already identified by the pre-trained supervised model.

Figure 10:
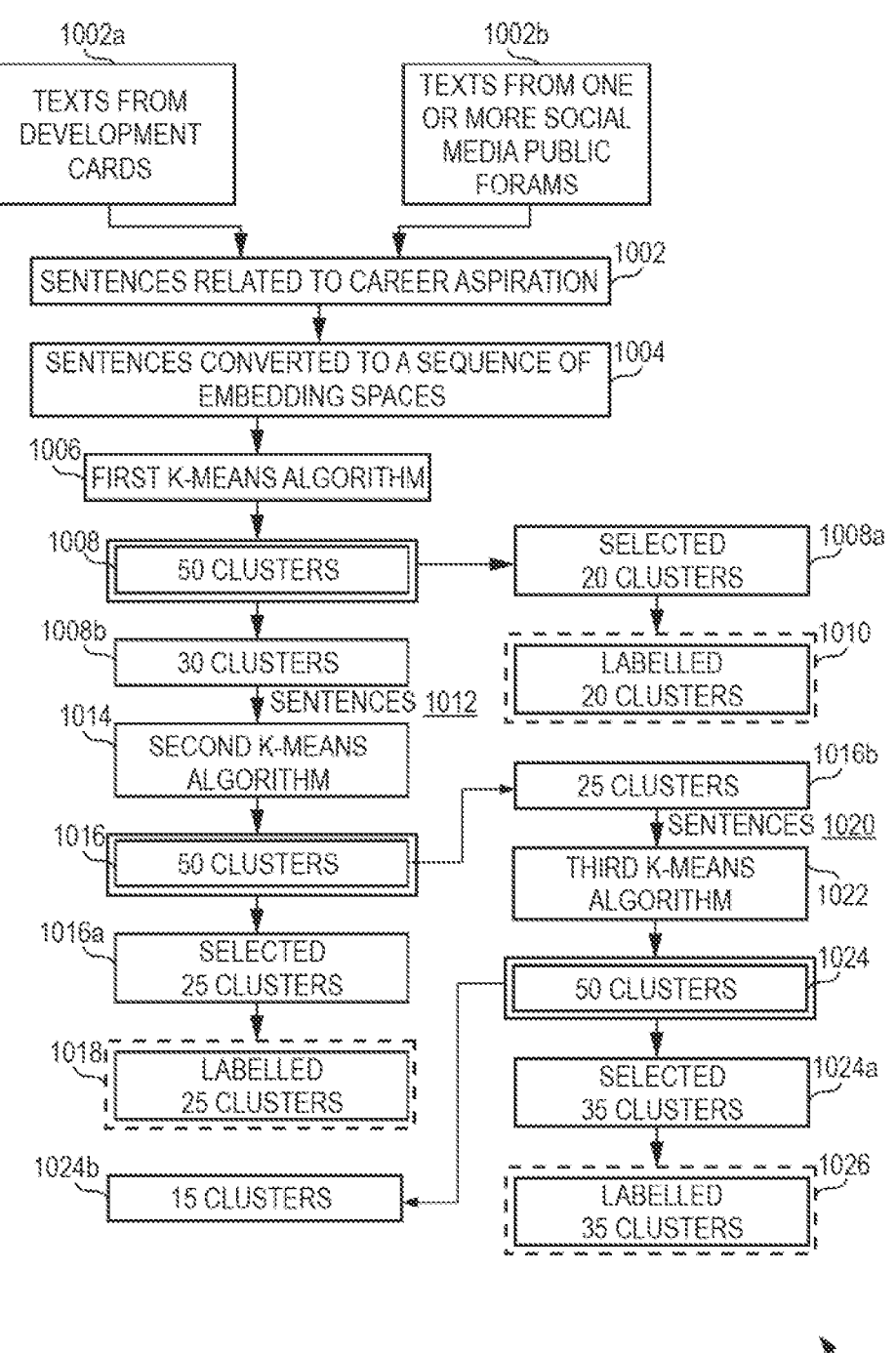
FIG. 10 is a block diagram representation of labelling only a selected set of clusters from a plurality of clusters for categorizing a career aspiration data of a plurality of employees of an enterprise, in accordance with an example embodiment.

FIG. 10 is a block diagram representation 1000 of labelling only a selected set of clusters from a plurality of clusters for categorizing career aspiration data of a plurality of employees of an enterprise, in accordance with an example embodiment. As explained with reference to FIG. 2, a raw data such as the raw data 102a being an unstructured and unlabelled dataset is collected from various data sources such as the sources 202a-n. As shown, a source represents texts collected from development cards having career aspirations section (see, 1002a hereinafter alternatively referred to as "source 1002a") filled by the employees and another source represents text collected from one or more social media public forums (see, 1002b hereinafter alternatively referred to as "source 1002b"). Some non-exhaustive examples of other resources include text data collected from employee feedback forms, employee surveys, manager appraisal data, and the like.

The development cards may include some irrelevant information of the employees such as personal information (e.g., name, address, birth date etc.) current projects along with the career aspirations category. Similarly, the social media public forums may also include irrelevant information for the objective and hence need filtering. For example, the total number of sentences from both the sources 1002a and 1002b is over 13,78,000. Filtered sentences only related to the career aspirations (see, 1002) from both the sources 1002a and 1002b are collected as raw data (hereinafter alternatively referred to as "raw sentences 1002"). For example, the total number of raw sentences 1002 is 11500 after filtering. In an example embodiment, algorithms such as Principal Component Analysis (PCA) or autoencoder may be used to reduce the dimension of the raw sentences 1002 for increasing interpretability but at the same time minimizing information loss.

The raw sentences 1002 are in a highly unstructured textual format. In this context, an unsupervised categorization using traditional algorithms like K-Means is a popular existing approach but there are limitations in terms of efficient updating of the algorithm over time. Further, the unsupervised algorithms are highly time consuming. Additionally, the presence of noise in such unsupervised approaches is unavoidable. All these issues are addressed by a supervised model trained using various embodiments of the present disclosure. An ensemble of three K-means algorithm is performed on the structured text data to categorize the structured text data into a number of insightful groups. Next, a supervised algorithm is trained to make the predictions more accurate and to eliminate the noise in the text data. This results in a more accurate classification over the ensemble of three K-means algorithms (i.e., the unsupervised algorithm). Further, updating an unsupervised learning algorithm is a strenuous task but the supervised model developed as explained herein is highly efficient in identifying new categories from the updated data in a very time-effective and easier manner.

As the raw sentences 1002 (e.g., 11500 sentences) are in an unstructured and unlabelled text format, they need to be pre-processed and transformed into a structured and unlabelled training dataset as explained with reference to FIG. 2. The raw sentences 1002 may be pre-processed using Regular Expressions (Regex) to remove spaces and symbols etc. Next, a Word2vec algorithm may be trained to convert the text into a sequence of embedding spaces/structured format (see, 1004, hereinafter alternatively referred to as "pre-processed sentences 1004"). Further, the context of the structured and unstructured text may be processed by executing a contextual dictionary algorithm that employs a thesaurus of alternative contexts of ambiguous words for finding a common context denominator.

The pre-processed sentences 1004 (i.e., 11,500 sentences converted into embedding spaces) being the structured and unlabelled training dataset (e.g., the structured and unlabelled training dataset 302 of FIG. 3) are used to train an unsupervised clustering algorithm to categorize the structured and unlabelled training dataset into a plurality of clusters/homogeneous groups. In one embodiment, an ensemble of three K-Means clustering algorithm is used to generate the plurality of clusters. As shown, first K-Means algorithm 1006 is fed with the 11,500 pre-processed sentences 1004 for classifying into 50 clusters 1008. In one example embodiment, a threshold for determining a homogeneous cluster is predetermined as having greater or equal to 80% of datapoints related to one pattern/topic. Based on the threshold matching, it is determined that out of 50 clusters 1008, 20 clusters 1008*a* (an example of the selected set of clusters 308 of FIG. 3) are homogeneous clusters, and the remaining 30 clusters 1008*b* are heterogeneous.

The set of homogeneous clusters is selected for labelling by an analyst. This is represented as labelled 20 clusters 1010. Each cluster from the selected set of 20 clusters 1008*a* is labelled with a label from a set of labels by an analyst. This is explained later in detail with reference to FIG. 11. Datapoints i.e., sentences 1012 (approximately, 7200 sentences out of 11,500 sentences) present in the set of heterogeneous clusters i.e., 30 clusters 1008*b* are fed to second K-Means algorithm 1014 for classifying into 50 clusters 1016. Based on the threshold matching, it is determined that out of 50 clusters 1016, 25 clusters 1016*a* are homogeneous clusters and the remaining 25 clusters 1016*b* are heterogeneous clusters. The set of homogeneous clusters is selected for labelling by an analyst. This is represented as labelled 25 clusters 1018. Each cluster from the selected set of 25 clusters 1016*a* is labelled with a label from the set of labels.

Datapoints i.e., sentences 1020 (approximately, 5100 sentences out of 11,500 sentences) present in the set of heterogeneous clusters i.e., 25 clusters 1016*b* are fed to third K-Means algorithm 1022 for classifying into 50 clusters 1024. Based on the threshold matching, it is determined that out of 50 clusters 1024, 35 clusters 1024*a* are homogeneous clusters, and the remaining 15 clusters 1024*b* are heterogeneous clusters. The set of homogeneous clusters is selected for labelling by an analyst. This is represented as labelled 35 clusters 1026. Each cluster from the selected set of 35 clusters 1024*a* is labelled with a label from the set of labels. The remaining 15 clusters 1024*b* (an example of the rejected set of clusters 310 of FIG. 3) being heterogeneous clusters are kept aside for any further processing. As an ensemble of three K-Means algorithm is used, a total number of clusters after each run is 150 clusters which are represented by two solid line boxes over each 50 clusters 1008, 50 clusters 1016, and 50 clusters 1024. Further, the total number of labelled clusters out of 150 clusters is 80 clusters which are represented by dotted line boxes over each selected set of clusters i.e., the labelled 20 clusters 1010, the labelled 25 clusters 1018 and the labelled 35 clusters 1026.

Figure 11:
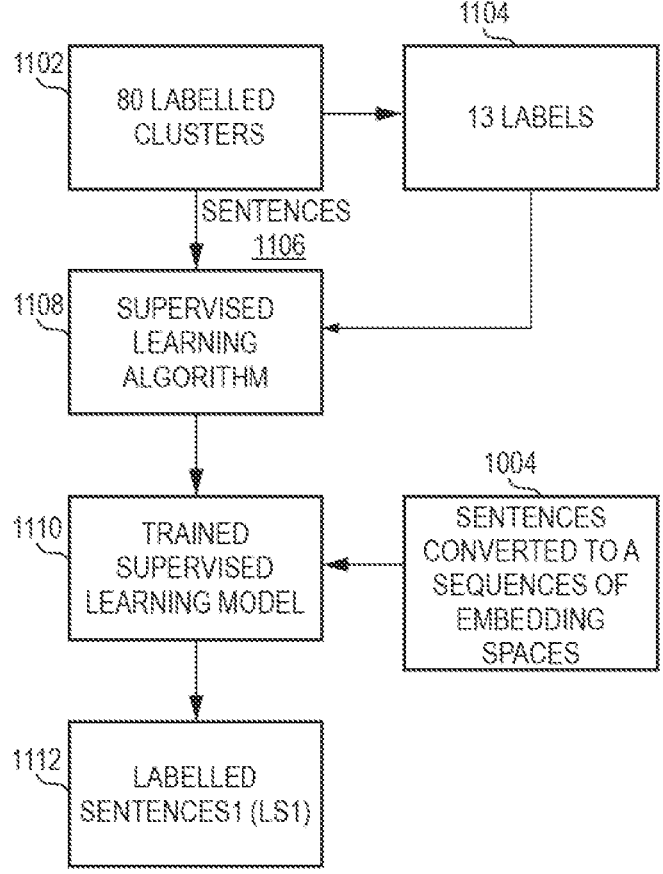
FIG. 11 is a block diagram representation of generating a trained supervised model for categorizing a career aspiration data of the plurality of employees of the enterprise, in accordance with an example embodiment.

FIG. 11 is a block diagram representation 1100 of generating a trained supervised model for categorizing a career aspiration data of a plurality of employees of an enterprise, in accordance with an example embodiment of the present disclosure. The set of labels is unique labels as confirmed by business experts and assigned by the analyst. Labelling in machine learning is tagging the group of samples with one or more labels by creating an identity for them. This identity is used for supervised learning and creating a model based on the identity. Each cluster from 80 labelled clusters is labelled with an applicable label from a set of labels e.g., 13 labels 1104 as shown. A few examples of labels of 13 labels 1104 include 'Training', 'Managerial Success', 'Enhancing Professional Skills' 'Gaining More Autonomy at Work' etc. Further, one or more clusters from 80 labelled clusters 1102 may fall under the same category as examined by the analyst and therefore be given the same one label. For example, a set of employees may have written sentences including 'senior level promotion' words as one of their career aspirations and another set of employees may have written sentences including 'next level promotion' words as one of their career aspirations. Therefore, there may be two different clusters each having concentration of words 'senior level promotion' and 'next level promotion'. When such two clusters get analysed by the analyst, he/she may give only one label i.e., 'next level promotion' to both the clusters.

As explained earlier with reference to FIG. 4, a supervised learning algorithm 1108 is trained based on the datapoints against the labelled clusters i.e., each cluster from the selected set of clusters. For an independent variable (X) being a subset of the pre-processed sentences 1004, the dependent variable (Y) consists of the 13 labels 1104 as assigned by the analyst. When the set of labels includes a plurality of labels, the independent variable (X) is divided into multi-class classification i.e., 13 categories/classes. Accordingly, an input dataset (not shown) such as the input dataset 402 is generated from a plurality of datapoints present in each cluster of the selected set of clusters. The sentences 1106 present in 80 labelled clusters 1102 form the input dataset. The sentences 1106 and 13 labels 1104 together form a labelled training dataset (not shown) (e.g., the labelled training dataset 404 of FIG. 4). The labelled training dataset is fed to the supervised learning algorithm 1108 for training.

Trained predictions generated using the labelled training dataset are used by the supervised learning algorithm 1108 to come up with a trained supervised learning model 1110 (hereinafter alternatively referred to as "supervised model 1110" or "model 1110"). In one embodiment, 80% of the sentences 1106 are used for training dataset and 20% of the sentences 1106 are used for a test dataset for testing the accuracy of the trained supervised model 1110 as explained with reference to FIG. 1A earlier. When the desirable accuracy (e.g., 87%) is achieved, the trained supervised model 1110 is saved and considered ready for launching in real time. Further, the trained supervised model 1110 is shown to be fed the structured and unlabelled training dataset/the pre-processed sentences 1004/11,500 sentences converted into a sequence of embedding spaces.

The pre-processed sentences 1004 specifically include a plurality of datapoints present in each cluster of 15 clusters 1024*b* of FIG. 10 as kept aside from further processing after running the third K-Means algorithm 1022 and a plurality of datapoints present in each cluster of 80 labelled clusters 1102. The supervised model 1110 scores each sentence of the pre-processed sentences 1004 by assigning an applicable label from 13 labels 1104 to generate Labelled Sentences1 (LS1) 1112 (an example of the Labelled Data1 (LD1) 502 of FIG. 5). Thus, when the model 1110 is used in a real-time, apart from the pre-processed sentences 1004, a new raw data is collected for classifying the career aspirations of the employees and is converted into a structured dataset i.e., embedding spaces and then fed to the supervised model 1110 for classifying into 13 labels 1104 as explained hereinabove.

Furthermore, employee data keeps getting revised and updated periodically. For example, Human Resources department of the enterprise may ask the employees to update the development cards at each quarter. Further, the new employees of the enterprise may also be asked to provide fresh development cards. The new sentences may relate to a new topic or objective, a set of employees is willing to progress, in near future. For example, in the updated data, a significant number of employees are aspiring to conduct weekend classes for school students to grow interest in them about new technology. Further, assuming that such a class/label (from 13 labels 1104) was not present in the model 1110, the new aspirations of the employees might be overlooked. As the volume and frequency of the new data are high, the model 1110 may end up labelling each new sentence related to some other topic with an existing label. This results in inaccuracy of the model predictions and there arises a need to generate the retrained model (i.e., the model 1110). An effective and simple method of retraining a model for an updated dataset as explained hereinabove with reference to FIG. 6 to FIG. 9 is explained hereinafter with reference to FIG. 12 and FIG. 13 for retraining the trained supervised model 1110 for the updated career aspiration data.

Figure 12:
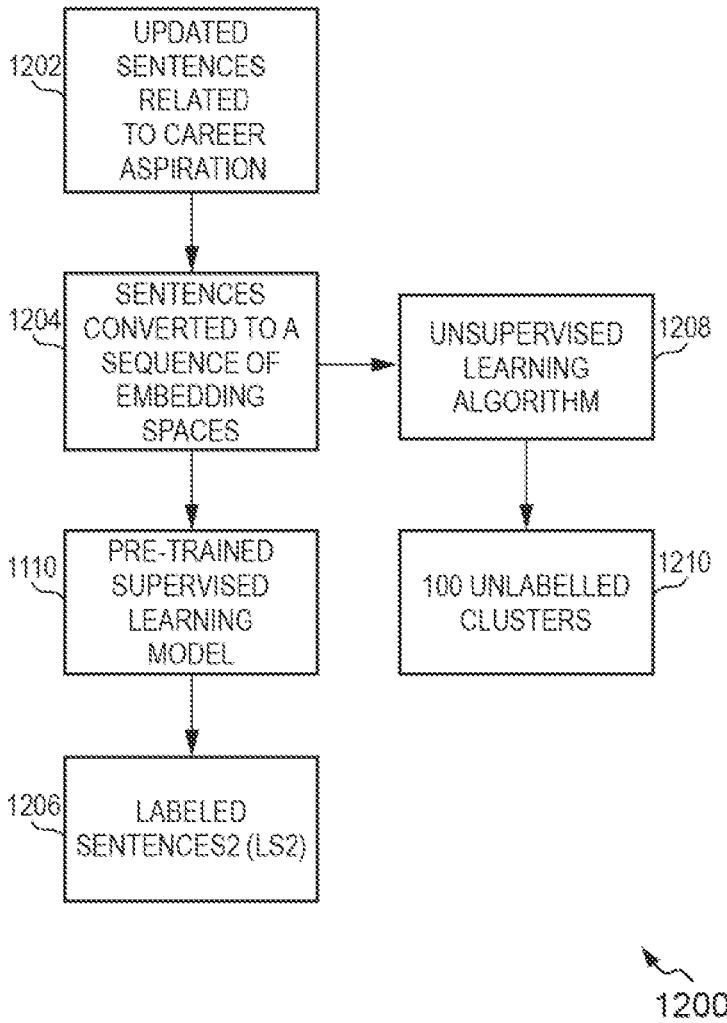
FIG. 12 is a block diagram representation of processing an updated career aspiration data of the plurality of employees of the enterprise, in accordance with an example embodiment.

FIG. 12 is a block diagram representation 1200 of processing an updated career aspiration data of a plurality of employees of an enterprise, in accordance with an example embodiment. Updated sentences related to career aspiration 1202 (hereinafter alternatively referred to as "updated sentences 1202") are shown. The updated sentences 1202 are raw. For example, a total number of the updated sentences 1202 is 36,500 compared to 11,500 sentences at the time of training the model 1110. Updates sentences 1202 are an example of the unstructured and unlabelled updated dataset 602 of FIG. 6. Accordingly, data pre-processing is performed over updated sentences 1202 to convert/transform the same into a sequence of embedding spaces 1204 (hereinafter alternatively referred to as "pre-processed updated sentences 1204"). The pre-processed updated sentences 1204 (i.e., 36,500 sentences) are an example of the structured and unlabelled retraining dataset 606 of FIG. 6.

The pre-processed updated sentences 1204 (i.e., 36,500 sentences) are used to retrain an unsupervised learning algorithm 1208 (e.g., a K-Means clustering algorithm) to be categorized into 100 unlabelled clusters 1210 (an example of the plurality of unlabelled clusters 610 of FIG. 6). 100 unlabelled clusters 1210 are not labelled by an analyst as it is a time-consuming and inaccurate process. The pre-processed updated sentences 1204 are also fed to the previously trained/pre-trained supervised model 1110 to be classified into Labelled Sentences2 (LS2) 1206. The LS2 1206 is an example of the Labelled Data2 LD2 612 of FIG. 6. The pre-trained supervised model 1110 is already trained to classify the pre-processed sentences 1004 into the set of labels i.e., 13 labels 1104 and therefore, the model 1110 is configured to assign a label to each sentence of the pre-processed updated sentences 1204 (i.e., 36,500 sentences) into one of 13 labels 1104. Since the supervised model 1110 is trained to predict only 13 labels 1104, the pre-processed updated sentences 1204 are classified into only 13 labels 1104.

However, there may be some new trends present in the updated dataset i.e., the pre-processed updated sentences 1204, and some sentences belong to a whole new different category. The model 1110, as is trained for, ends up giving a label to each sentence of the pre-processed updated sentences 1204, however, it is possible that the label is wrong and the particular sentence or a set of sentences belongs to a different category. Therefore, labelling only based on the trained supervised model 1110 results in inaccurate predictions. In order to identify whether any new patterns are present in the pre-processed updated sentences 1204, first, the unsupervised algorithm 1208 is run that generates some clusters which were not present earlier.

FIG. 13 is a block diagram representation 1300 of classifying an updated career aspiration data of a plurality of employees into an updated set of labels by executing a retrained supervised model, in accordance with an example embodiment of the present disclosure. The LS2 1206 labelled using 13 labels 1104 and 100 unlabelled clusters 1210 are processed to determine homogeneity of 100 unlabelled clusters 1210 by superimposing the Labelled Sentences2 1206 over the 100 unlabelled clusters 1210 (see, 1302). Superimposing results in having a set of homogeneous unlabelled clusters and the remaining set is of heterogeneous unlabelled clusters because the level of noise in those clusters is higher than a predetermined threshold value (e.g., greater or equal to 80% similarity with the labelled sentences2 1206). As shown, 83 unlabelled clusters of 100 unlabelled clusters 1210 are homogeneous and are represented as 83 homogeneous unlabelled clusters 1304.

For example, 'International Relocation' is one of the labels from 13 labels 1104. If more than 80% sentences in one unlabelled cluster are tagged as 'International Relocation' using the supervised model 1110, then that unlabelled cluster is labelled as 'International Relocation'. Thus, while superimposing, a dominant label/pattern in an unlabelled cluster is assigned as the label to that particular unlabelled cluster. Therefore, after superimposing with the labelled sentences2 1206, 83 homogeneous unlabelled clusters 1304 become 83 labelled clusters.

The remaining 17 unlabelled clusters of 100 unlabelled clusters are identified as 17 heterogeneous unlabelled clusters 1306. 17 heterogeneous unlabelled clusters 1306 are identified as heterogeneous unlabelled clusters because the sentences present in each heterogeneous unlabelled cluster represent a whole new category of career aspiration. For example, sentences present in 17 heterogeneous unlabelled clusters 1306 mostly represent a new category, namely, 'Internal Transfer', a category where the employees want to diversify their learnings by taking an internal transfer to another department of the same enterprise to advance in their careers. 17 heterogeneous unlabelled clusters 1306 are sent to an analyst. The analyst then labels each heterogeneous unlabelled cluster using a new label from a set of new labels e.g., 1 new label 1308 (i.e., Internal Transfer). Further, it is possible that out of 17 heterogeneous unlabelled clusters 1306, 10 heterogeneous unlabelled clusters represent a new category and 7 heterogeneous unlabelled clusters represent another new category. In that case, the analyst labels 10 heterogeneous unlabelled clusters with one new label and 7 heterogeneous unlabelled clusters with another new label from the set of new labels.

Therefore, instead of labelling each unlabelled cluster of 100 unlabelled clusters 1210, which is a tedious job, the analyst only needs to label 17 heterogeneous unlabelled clusters 1306 which are quite less in number. 13 labels 1104 and 1 new label 1308 together create an updated set of labels i.e., 14 labels 1310 (e.g., the updated set of labels 804 of FIG. 8). As an applicable label from 13 labels 1104 is given to 83 homogeneous unlabelled clusters 1304 and 1 new label 1308 is given to 17 heterogeneous unlabelled clusters 1306, each sentence present in each unlabelled cluster of 100 unlabelled clusters 1210 is given an applicable label from the updated set of labels i.e., 14 labels 1310.

Next, a supervised learning algorithm 1314 is trained based on the datapoints against the labelled clusters i.e., each cluster from the 100 unlabelled clusters 1210. For an independent variable (X) being a subset of the pre-processed updated sentences 1204, a dependent variable (Y) consists of 14 labels 1310. Accordingly, an updated input dataset (not shown) is generated from a plurality of sentences present in each cluster of 100 unlabelled clusters 1210. The updated input dataset and the updated set of labels together form a labelled retraining dataset (not shown). The labelled retraining dataset is fed to the supervised learning algorithm 1314. The sentences 1312 present in each labelled cluster of 14 labelled clusters/each unlabelled cluster of 100 unlabelled clusters 1210/the pre-processed updated sentences 1204 along with 14 labels 1310 are used to train the supervised learning algorithm 1314.

Trained predictions generated using the labelled retraining dataset are used by the supervised learning algorithm 1314 to come up with a retrained supervised learning model 1316 (hereinafter alternatively referred to as "supervised model 1316" or "model 1316"). The retrained supervised model 1316 provides a legitimate assignment of category for the unlabelled data i.e., 17 heterogeneous unlabelled clusters 1306. In one embodiment, the model 1316 is developed on a sentence level instead of overall career aspiration paragraph level to get more accurate results. Further, 20% of the sentences 1312 may be used as a test dataset (not shown). Once retrained, the retrained supervised model 1316 is tested using the test dataset to determine the accuracy level. When the desired accuracy is achieved, the model 1316 is saved and considered ready for relaunching in a real-time.

Next, the pre-processed updated sentences 1204 i.e., the structured and unlabelled retraining dataset is classified into the updated set of labels by executing the retrained supervised model 1316. The supervised model 1316 scores 36,500 sentences converted into a sequence of embedding spaces 1204 by assigning an applicable label from 14 labels 1310 to each sentence of the pre-processed updated sentences 1204 i.e., 36,500 sentences to generate an updated Labelled Sentences3 (LS3) 1318. The updated LS3 1318 are then rolled back to individual career aspiration levels. Thus, when the retrained model 1316 is used in a real-time, apart from 36,500 sentences, any relevant new raw data is collected, converted into a structured dataset for feeding to the retrained supervised model 1316, and is classified in to one of 14 labels 1310.

Thus, an effective system is developed that can capture new trends, if any, from the unstructured textual data that is useful for establishing an efficient people management/human resources management. Further, the objective is to develop a system that can assist in not only the effective categorization of unlabelled datasets but also efficient retraining of the model on a new or revised dataset. The accuracy of the model provides significant lift over traditional unsupervised methods and also increases coverage of predictions. The supervised model is explained throughout FIG. 10 to FIG. 13 for categorizing text data. However, without deviating from the scope of the disclosure, the model developed as described herein is suitable for any type of unlabelled and unstructured data that is not organized into a uniform format, and thus, is hard to operate. Examples of unstructured data include text, images, video, and audio files.

For instance, this approach is also suitable to understand current trends of discussion amongst people on social media conversations such as through the comments, blogs, or discussion portals. This is a type where the data gets updated quite faster and on a regular basis. Therefore, one may never end up at a stage where he/she knows everything what is being discussed and a better usage of this approach can be utilized in such a scenario in a less time-consuming and more accurate manner. Further, retraining of the model is made quite less cumbersome compared to existing techniques. This helps in easy and continuous identification of new distinct underlying pattern in data which might not previously be present. Apart from this, the model can be used to classify image data, numerical data and the like.

FIG. 14 illustrates a flow diagram of a method 1400 for processing an unstructured and unlabelled data, in accordance with an example embodiment. More specifically, the method 1400 for training a supervised model to classify the unstructured and unlabelled data into a set of labels is disclosed. The method 1400 depicted in the flow diagram may be executed by, for example, a computing system. Operations of the method 1400, and combinations of operation in the method 1400, may be implemented by, for example, hardware, firmware, a processor, circuitry and/or a different device associated with the execution of software that includes one or more computer program instructions. The method 1400 starts at step 1402.

At 1402, the method 1400 includes generating, by a processor, a structured and unlabelled training dataset from an unstructured and unlabelled dataset. Examples of the unstructured and unlabelled dataset include a textual data, an image data and a numerical data.

At 1404, the method 1400 includes categorizing, by the processor, the structured and unlabelled training dataset into a plurality of clusters by executing an unsupervised learning algorithm. Each cluster of a selected set of clusters from the plurality of clusters is labelled with an applicable label from a set of labels. Each cluster of the selected set of clusters is selected based on the homogeneity of each cluster.

At 1406, the method 1400 includes executing, by the processor, a supervised learning algorithm using a labelled training dataset to generate a trained supervised learning model. The labelled training dataset includes the set of labels and an input dataset generated from a plurality of datapoints present in each cluster of the selected set of clusters.

At 1408, the method 1400 includes generating, by the processor, a Labelled Data1 (LD1) by executing the trained supervised model. The trained supervised model is configured to assign an applicable label from the set of labels to each datapoint of the structured and unlabelled training dataset. An applicable label from the set of labels is assigned to each datapoint of a plurality of datapoints present in each cluster of a rejected set of clusters from the plurality of clusters. Each cluster of the rejected set of clusters is a heterogeneous cluster. The method 1400 ends at step 1408.

FIG. 15A and FIG. 15B collectively illustrate a flow diagram of another method 1500 for processing an unstructured and unlabelled data, in accordance with an example embodiment. More specifically, the method 1500 for retraining a pre-trained supervised model for processing an updated unstructured and unlabelled data is disclosed. The method 1500 depicted in the flow diagram may be executed by, for example, a computing system. Operations of the method 1500, and combinations of operation in the method 1500, may be implemented by, for example, hardware, firmware, a processor, circuitry and/or a different device associated with the execution of software that includes one or more computer program instructions. The method starts at step 1502.

At 1502, the method 1500 includes generating, by a processor, a structured and unlabelled retraining dataset from an unstructured and unlabelled updated dataset.

At 1504, the method 1500 includes generating, by the processor, a Labelled Data2 (LD2) by executing a pre-trained supervised model configured to assign an applicable label from a set of labels to each datapoint of the structured and unlabelled retraining dataset. The pre-trained supervised model is generated previously using a labelled training dataset. The labelled training dataset includes the set of labels and an input dataset generated from a plurality of datapoints present in each cluster of a selected set of clusters from a plurality of clusters. Each cluster is labelled with a label from the set of labels and the plurality of clusters is generated to categorize a structured and unlabelled training dataset. The structured and unlabelled training dataset is generated from an unstructured and unlabelled dataset.

At 1506, the method 1500 includes categorizing, by the processor, the structured and unlabelled retraining dataset into a plurality of unlabelled clusters by executing an unsupervised learning algorithm.

At 1508, the method 1500 includes identifying, by the processor, a set of heterogeneous unlabelled clusters from the plurality of unlabelled clusters wherein each heterogeneous unlabelled cluster is labelled with a new label from a set of new labels. In one embodiment, homogeneity of the plurality of unlabelled clusters is determined by superimposing the Labelled Data2 (LD2) over the plurality of unlabelled clusters in order to identify the set of heterogeneous unlabelled clusters.

At 1510, the method 1500 includes generating, by the processor, an updated set of labels including the set of labels and the set of new labels.

At 1512, the method 1500 includes executing, by the processor, a supervised learning algorithm using a labelled retraining dataset to generate a retrained supervised learning model. The labelled retraining dataset includes the updated set of labels and an updated input dataset generated from a plurality of datapoints present in each unlabelled cluster of the plurality of unlabelled clusters.

At 1514, the method 1500 includes generating, by the processor, an updated labelled data3 (LD3) by executing the retrained supervised model. The retrained supervised model is configured to assign an applicable label from the updated set of labels to each datapoint of the structured and unlabelled retraining dataset. The method 1500 ends at step 1514.

Figure 16:
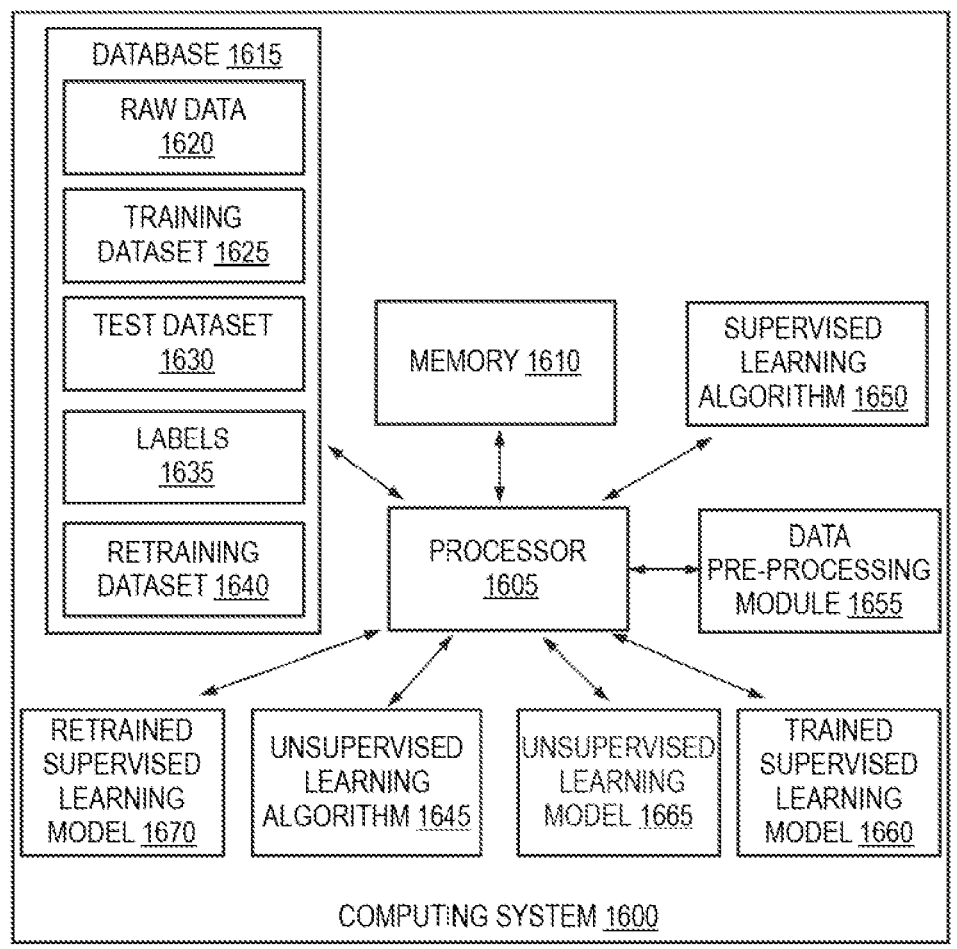
FIG. 16 is a simplified block diagram of a computing system, in accordance with one embodiment of the present disclosure.

FIG. 16 is a simplified block diagram of a computing system 1600, in accordance with one embodiment of the present disclosure. The computing system 1600 includes at least one processor 1605 for executing instructions. Instructions may be stored in, for example, but not limited to, a memory 1610. The processor 1605 may include one or more processing units (e.g., in a multi-core configuration). In one embodiment, the processor 1605 may be operatively coupled to a communication interface (not shown) such that the computing system 1600 is capable of communicating with a remote device (not shown). The components of the computing system 1600 provided herein may not be exhaustive, and the computing system 1600 may include more or fewer components than those depicted in FIG. 16. Further, two or more components may be embodied in one single component, and/or one component may be configured using multiple sub-components to achieve the desired functionalities. Some components of the computing system 1600 may be configured using hardware elements, software elements, firmware elements and/or a combination thereof.

In an embodiment, the processor 1605 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 1610 is configured to store machine executable instructions to be accessed by the processor 1605. The memory 1610 can be any type of storage accessible to the processor 1605. For example, the memory 1610 may include volatile or non-volatile memories, or a combination thereof. In some non-limiting examples, the memory 1610 can be four to sixty-four Gigabytes (GB) of Dynamic Random Access Memory ("DRAM") or Static Random Access Memory ("SRAM"). In addition, some examples may include supplementary flash memory installed via a PCM-CIA slot.

The processor 1605 may also be operatively coupled to a database 1615. In some embodiments, the database 1615 is integrated within the computing system 1600. For example, the computing system 1600 may include one or more hard disk drives as the database 1615. The database 1615 may include multiple storage units such as hard disks and/or solid-state disks in a redundant array of inexpensive disks (RAID) configuration. The database 1615 may include a storage area network (SAN) and/or a network attached storage (NAS) system. In other embodiments, the database 1615 may be external to the computing system 1600 and may be accessed by the computing system 1600 using a storage interface (not shown). The storage interface may be any component capable of providing the processor 1605 with access to the database 1615. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1605 with access to the database 1615.

The database 1615 is suitable for storing and/or retrieving data, such as, but not limited to, a raw data 1620, a training dataset 1625, a test dataset 1630, labels 1635, and a retraining dataset 1640. Moreover, the processor 1605 is configured to process each step of the one or more steps of the methods 1400 and 1500 as explained with reference to FIG. 14, FIG. 15A and FIG. 15B to process an unstructured and unlabelled data and an updated unstructured and unlabelled data. In one embodiment, the processor 1605 is configured to pre-process the raw data 1620 using a data pre-processing module 1655 and converts the raw data 1620 into a structured and unlabelled dataset that is further split into the training dataset 1625 and the test dataset 1630. The data pre-processing module 1655 includes one or more data pre-processing algorithms for performing various tasks such as, but not limited to, noise filtering, missing value imputation, feature selection, space transformation, and the like. Some non-exhaustive examples of the data pre-processing algorithms include, Iterative Partitioning Filter (IPF), K-Nearest Neighbor Imputation (KNNI), relief algorithm, Mutual Information based Features Selection (MIFS), Locally Linear Embedding (LLE) and the like.

The training dataset 1625 is retrieved by the processor 1605 to generate one or more Artificial Intelligence (AI) models. For example, the processor 1605 executes an unsupervised learning algorithm 1645 using the training dataset 1625 to generate a trained an unsupervised learning model 1665. In at least one embodiment, the unsupervised learning algorithm 1645 is a clustering algorithm. Some non-limiting examples of clustering algorithms include hierarchical clustering, k-means algorithm, kernel-based clustering algorithms, density-based clustering algorithms, spectral clustering algorithms and the like. In at least one embodiment, a selected set of clusters from a plurality of clusters generated by the unsupervised learning model 1665 is labelled using an applicable label from a set of labels by an analyst. The set of labels is part of the labels 1635. The set of labels is used along with a plurality of datapoints present in the selected set of the clusters by the processor 1605 to train a supervised learning algorithm 1650 to come up with a trained supervised learning model 1660. Some non-exhaustive examples of the supervised learning algorithm 1650 include Naïve Bayes algorithm, C4.5 algorithm, Support Vector Machines (SVM), neural networks, decision trees and the like. The processor 1605 also executes the trained supervised model 1660 (hereinafter alternatively referred to as "model 1660") to classify each datapoint of structured and unlabelled dataset into an applicable label from the set of labels by generating a labelled data (not shown, e.g., LD1 502 of FIG. 5). The test dataset 1630 is retrieved from the database 1615 by the processor 1605 for testing the accuracy of the model 1660.

Apart from the set of labels, the labels 1635 include a set of new labels and an updated set of labels that is summation of the set of labels and the set of new labels. The set of new labels is determined by an analyst for labelling a set of heterogeneous unlabelled clusters from a plurality of unlabelled clusters generated by the unsupervised learning algorithm 1645 when it is fed the retraining dataset 1640 as retrieved from the database 1615 by the processor 1605. The retraining dataset 1640 along with the set of labels from the labels 1635 are fed to the trained supervised model 1660 to generate a labelled data (not shown) such as the LD2 612 of FIG. 6. The processor 1605 is configured to superimpose the labelled data over the plurality of unlabelled clusters to determine a set of homogeneous unlabelled clusters and thereby identify the set of heterogeneous unlabelled clusters for sending to the analyst for labelling using the set of new labels.

The processor 1605 is configured to generate the updated set of labels using the set of labels and the set of new labels and store as part of the labels 1635 in the database 1615. The datapoints present in the plurality of unlabelled clusters and the set of updated labels are fed to the supervised learning algorithm 1650 for retraining the previously trained/pretrained supervised model 1660. A retrained supervised learning model 1670 is thereafter executed by the processor 1605 by feeding the retraining dataset 1640 retrieved from the database 1615. The retrained supervised model 1670 is configured to assign an applicable label from the updated set of labels to each datapoints of the retraining dataset 1640.

In a non-limiting example, the processor 1605 is configured to generate learned functions from multiple different machine learning classes, models, or algorithms. For example, the processor 1605 may generate decision trees, decision forest, kernel classifiers and regression machines with a plurality of reproducing kernels, non-kernel regression and classification machines such as logistic, multi-layer neural networks with various topologies, Bayesian-type classifiers such as Nave Bayes and Boltzmann machines, logistic regression, multinomial logistic regression, probit regression, survival or duration analysis, radial basis functions, Sequential Learning In Quest (SLIQ), support vector machines, k-nearest neighbors, geospatial predictive modeling and/or other classes of learned functions.

The disclosed methods with reference to FIG. 14, FIG. 15A and FIG. 15B, or one or more operations of the methods 1400 and 1500 may be implemented using software including computer-executable instructions stored on one or more computer-readable media (e.g., non-transitory computer-readable media), such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the computing system 1600 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and are well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, the method comprising:

generating, by a processor, a structured and unlabelled training dataset from an unstructured and unlabelled dataset;

categorizing, by the processor, the structured and unlabelled training dataset into a plurality of clusters by executing an unsupervised learning algorithm, wherein the categorizing includes clustering the structured and unlabelled training dataset into first clusters with a first k-means clustering algorithm, determining that first heterogeneous clusters of the first clusters are heterogeneous based on amounts of datapoints of the first heterogeneous clusters, that are related to one or more of first topics or first patterns, being below a threshold, determining that first homogeneous clusters of the first clusters are homogeneous based on amounts of datapoints of the first homogeneous clusters, that are related to one or more of the first topics or the first patterns, being above the threshold, clustering the first heterogeneous clusters into second clusters with a second k-means clustering algorithm that is different from the first k-means clustering algorithm, determining that second heterogeneous clusters of the second clusters are heterogeneous based on amounts of datapoints of the second heterogeneous clusters, that are related to one or more of second topics or second patterns, being below the threshold, and determining that second homogeneous clusters of the second clusters are homogeneous based on amounts of datapoints of the second homogeneous clusters, that are related to one or more of the second topics or the second patterns, being above the threshold, wherein each cluster of a selected set of clusters from the plurality of clusters is labelled with an applicable label from a set of labels, wherein the selected set of clusters includes the first and second homogeneous clusters;

training, by the processor, a supervised learning algorithm using a labelled training dataset to generate a trained supervised learning model, the labelled training dataset comprising the set of labels and an input dataset generated from a plurality of datapoints present in each cluster of the selected set of clusters;

generating, by the processor, a Labelled Data1 (LD1) by executing the trained supervised learning model, wherein the trained supervised learning model is configured to assign an applicable label from the set of labels to each datapoint of the first and second heterogeneous clusters;

generating a Labelled Data2 (LD2) by executing the trained supervised learning model, the trained supervised learning model configured to assign an applicable label from the set of labels to each datapoint of a structured and unlabelled retraining dataset;

categorizing the structured and unlabelled retraining dataset into a plurality of unlabelled clusters by executing the unsupervised learning algorithm;

determining homogeneity of the plurality of unlabelled clusters by superimposing the LD2 over the plurality of unlabelled clusters and identifying how many points in each respective clusters of the plurality of unlabelled clusters have a same label of the set of labels; and retraining the trained supervised learning model based on clusters from the plurality of unlabelled clusters that are determined as being heterogeneous based on the determining homogeneity of the plurality of unlabelled clusters.

2. The method as claimed in claim 1, wherein generating the LD1 by executing the trained supervised learning model, further comprises:

assigning an applicable label from the set of labels to each datapoint of a plurality of datapoints present in each cluster of a rejected set of clusters from the plurality of clusters, wherein the rejected set of clusters includes the first and second heterogeneous clusters.

3. The method as claimed in claim 1, wherein each cluster of the selected set of clusters is selected based on homogeneity of each cluster of the selected set of clusters.

4. The method as claimed in claim 1, wherein the unstructured and unlabelled dataset is one of a textual data, an image data, or a numerical data.

5. The method as claimed in claim 1, further comprising:

generating the structured and unlabelled retraining dataset from an unstructured and unlabelled updated dataset.

6. The method as claimed in claim 1, further comprising:

identifying a set of heterogeneous unlabelled clusters from the plurality of unlabelled clusters, wherein each heterogeneous unlabelled cluster is labelled with a new label from a set of new labels; and generating an updated set of labels comprising the set of labels and the set of new labels.

7. The method as claimed in claim 6, wherein the retraining includes:

executing the supervised learning algorithm using a labelled retraining dataset to generate a retrained supervised learning model, the labelled retraining dataset comprising the updated set of labels and an updated input dataset generated from a plurality of datapoints present in each unlabelled cluster of the plurality of unlabelled clusters.

8. The method as claimed in claim 7, further comprising:

generating an updated labelled data3 (LD3) by executing the retrained supervised learning model, the retrained supervised learning model configured to assign an applicable label from the updated set of labels to each datapoint of the structured and unlabelled retraining dataset.

9. A computing system comprising:

a memory comprising executable instructions; and a processor configured to execute the instructions to cause the computing system to at least:

generate a structured and unlabelled training dataset from an unstructured and unlabelled dataset;

categorize the structured and unlabelled training dataset into a plurality of clusters by executing an unsupervised learning algorithm, wherein to categorize the structured and unlabelled training dataset into the plurality of clusters, the processor is configured to execute the instructions to cause the computing system to at least:

cluster the structured and unlabelled training dataset into first clusters with a first k-means clustering algorithm, determine that first heterogeneous clusters of the first clusters are heterogeneous based on amounts of datapoints of the first heterogeneous clusters, that are related to one or more of first topics or first patterns, being below a threshold, determine that first homogeneous clusters of the first clusters are homogeneous based on amounts of datapoints of the first homogeneous clusters, that are related to one or more of the first topics or the first patterns, being above the threshold, cluster the first heterogeneous clusters into second clusters with a second k-means clustering algorithm that is different from the first k-means clustering algorithm, determine that second heterogeneous clusters of the second clusters are heterogeneous based on amounts of datapoints of the second heterogeneous clusters, that are related to one or more of second topics or second patterns, being below the threshold, and determine that second homogeneous clusters of the second clusters are homogeneous based on amounts of datapoints of the second homogeneous clusters, that are related to one or more of the second topics or the second patterns, being above the threshold, wherein each cluster of a selected set of clusters from the plurality of clusters is labelled with an applicable label from a set of labels, wherein the selected set of clusters includes the first and second homogeneous clusters;

train a supervised learning algorithm using a labelled training dataset to generate a trained supervised learning model, the labelled training dataset comprising the set of labels and an input dataset generated from a plurality of datapoints present in each cluster of the selected set of clusters;

generate a Labelled Data1 (LD1) by executing the trained supervised learning model, wherein the trained supervised learning model is configured to assign an applicable label from the set of labels to each datapoint of the first and second heterogeneous clusters;

generate a Labelled Data2 (LD2) by executing the trained supervised learning model, the trained supervised learning model configured to assign an applicable label from the set of labels to each datapoint of a structured and unlabelled retraining dataset;

categorize the structured and unlabelled retraining dataset into a plurality of unlabelled clusters by executing the unsupervised learning algorithm;

determine homogeneity of the plurality of unlabelled clusters by superimposing the LD2 over the plurality of unlabelled clusters and identifying how many points in each respective clusters of the plurality of unlabelled clusters have a same label of the set of labels; and retrain the trained supervised learning model based on clusters from the plurality of unlabelled clusters that are determined as being heterogeneous based on the determining homogeneity of the plurality of unlabelled clusters.

10. The computing system as claimed in claim 9, wherein for generating the LD1 by executing the trained supervised learning model, the computing system is further caused to:

assign an applicable label from the set of labels to each datapoint of a plurality of datapoints present in each cluster of a rejected set of clusters from the plurality of clusters, wherein the rejected set of clusters includes the first and second heterogeneous clusters.

11. The computing system as claimed in claim 9, wherein each cluster of the selected set of clusters is selected based on homogeneity of each cluster of the selected set of clusters.

12. The computing system as claimed in claim 9, wherein the computing system is further caused to:

generate the structured and unlabelled retraining dataset from an unstructured and unlabelled updated dataset.

13. The computing system as claimed in claim 9, wherein the computing system is further caused to:

identify a set of heterogeneous unlabelled clusters from the plurality of unlabelled clusters, wherein each heterogeneous unlabelled cluster is labelled with a new label from a set of new labels; and generate an updated set of labels comprising the set of labels and the set of new labels.

14. The computing system as claimed in claim 13, wherein to perform the retraining, the computing system is further caused to:

execute the supervised learning algorithm using a labelled retraining dataset to generate a retrained supervised learning model, the labelled retraining dataset comprising the updated set of labels and an updated input dataset generated from a plurality of datapoints present in each unlabelled cluster of the plurality of unlabelled clusters.

15. The computing system as claimed in claim 14, wherein the computing system is further caused to:

generate an updated labelled data3 (LD3) by executing the retrained supervised learning model, the retrained supervised learning model configured to assign an applicable label from the updated set of labels to each datapoint of the structured and unlabelled retraining dataset.

16. At least one computer readable storage medium comprising a set of instructions, which when executed by a computing device, cause the computing device to:

generate a structured and unlabelled training dataset from an unstructured and unlabelled dataset;

categorize the structured and unlabelled training dataset into a plurality of clusters by executing an unsupervised learning algorithm, wherein to categorize the structured and unlabelled training dataset into the plurality of clusters, the set of instructions when executed by the computing device, cause the computing device to at least:

cluster the structured and unlabelled training dataset into first clusters with a first k-means clustering algorithm, determine that first heterogeneous clusters of the first clusters are heterogeneous based on amounts of datapoints of the first heterogeneous clusters, that are related to one or more of first topics or first patterns, being below a threshold, determine that first homogeneous clusters of the first clusters are homogeneous based on amounts of datapoints of the first homogeneous clusters, that are related to one or more of the first topics or the first patterns, being above the threshold, cluster the first heterogeneous clusters into second clusters with a second k-means clustering algorithm that is different from the first k-means clustering algorithm, determine that second heterogeneous clusters of the second clusters are heterogeneous based on amounts of datapoints of the second heterogeneous clusters, that are related to one or more of second topics or second patterns, being below the threshold, and determine that second homogeneous clusters of the second clusters are homogeneous based on amounts of datapoints of the second homogeneous clusters, that are related to one or more of the second topics or the second patterns, being above the threshold, wherein each cluster of a selected set of clusters from the plurality of clusters is labelled with an applicable label from a set of labels, wherein the selected set of clusters includes the first and second homogeneous clusters;

train a supervised learning algorithm using a labelled training dataset to generate a trained supervised learning model, the labelled training dataset comprising the set of labels and an input dataset generated from a plurality of datapoints present in each cluster of the selected set of clusters;

generate a Labelled Data1 (LD1) by executing the trained supervised learning model, wherein the trained supervised learning model is configured to assign an applicable label from the set of labels to each datapoint of the first and second heterogeneous clusters;

generate a Labelled Data2 (LD2) by executing the trained supervised learning model, the trained supervised learning model configured to assign an applicable label from the set of labels to each datapoint of a structured and unlabelled retraining dataset;

categorize the structured and unlabelled retraining dataset into a plurality of unlabelled clusters by executing the unsupervised learning algorithm;

determine homogeneity of the plurality of unlabelled clusters by superimposing the LD2 over the plurality of unlabelled clusters and identifying how many points in each respective clusters of the plurality of unlabelled clusters have a same label of the set of labels; and retrain the trained supervised learning model based on clusters from the plurality of unlabelled clusters that are determined as being heterogeneous based on the determining homogeneity of the plurality of unlabelled clusters.

17. The at least one computer readable storage medium of claim 16, wherein the instructions, when executed, cause the computing device to:

assign an applicable label from the set of labels to each datapoint of a plurality of datapoints present in each cluster of a rejected set of clusters from the plurality of clusters, wherein the rejected set of clusters includes the first and second heterogeneous clusters.

* * * * *